United States Patent
Forster

(10) Patent No.: US 6,327,587 B1
(45) Date of Patent: Dec. 4, 2001

(54) CACHING OPTIMIZATION WITH DISK AND/OR MEMORY CACHE MANAGEMENT

(75) Inventor: Michael Forster, Prairie Village, KS (US)

(73) Assignee: Digital Archaeology, Inc., Lenexa, KS (US)

( * ) Notice: Subject to any disclaimer, the term of this patent is extended or adjusted under 35 U.S.C. 154(b) by 0 days.

(21) Appl. No.: 09/166,441

(22) Filed: Oct. 5, 1998

(51) Int. Cl.[7] .................................................. G06F 17/30
(52) U.S. Cl. ................................ 707/2; 707/100; 706/45
(58) Field of Search ............................ 707/1–4, 100–102; 706/10, 11, 13, 50–51, 54, 45, 60–62

(56) References Cited

U.S. PATENT DOCUMENTS

| | | | |
|---|---|---|---|
| 4,989,132 | 1/1991 | Mellender et al. | 364/200 |
| 5,019,961 | 5/1991 | Addesso et al. | 364/192 |
| 5,121,494 | 6/1992 | Dias et al. | 395/600 |
| 5,193,185 | 3/1993 | Lanter | 395/600 |
| 5,226,111 | 7/1993 | Black et al. | 395/54 |
| 5,259,066 | 11/1993 | Schmidt | 395/54 |
| 5,276,870 | 1/1994 | Shan et al. | 395/600 |
| 5,301,317 | 4/1994 | Lohman et al. | 395/600 |
| 5,307,445 | 4/1994 | Dalal et al. | 395/66 |
| 5,325,525 | 6/1994 | Shan et al. | 395/650 |
| 5,418,942 | 5/1995 | Krawchuk et al. | 395/600 |
| 5,418,943 * | 5/1995 | Borgida et al. | 707/4 |
| 5,469,568 | 11/1995 | Shiefer et al. | 395/600 |
| 5,481,700 | 1/1996 | Thuraisingham | 395/600 |
| 5,495,606 | 2/1996 | Borden et al. | 395/600 |
| 5,515,531 | 5/1996 | Fujiwara et al. | 395/600 |
| 5,537,590 | 7/1996 | Amado | 395/600 |
| 5,542,073 | 7/1996 | Schiefer et al. | 395/600 |
| 5,546,571 | 8/1996 | Shan et al. | 395/600 |
| 5,548,749 | 8/1996 | Kroenke et al. | 395/600 |
| 5,548,755 | 8/1996 | Leung et al. | 395/600 |
| 5,548,770 | 8/1996 | Bridges | 395/800 |
| 5,555,404 | 9/1996 | Torbjornsen et al. | 395/600 |
| 5,560,006 | 9/1996 | Layden et al. | 395/600 |

(List continued on next page.)

OTHER PUBLICATIONS

"Observer: An Approach for Query Procesing in Global Information Systems based on Interoperation across Pre–existing Ontologies," Mena et al., Proceedings of the 1996 First International Conference on Cooperative Information Systems, Jun. 19–21, 1996, pag.*

(List continued on next page.)

Primary Examiner—Hosain T. Alam
(74) Attorney, Agent, or Firm—Peter M. Dichiara; Gregory S. Discher; Hale and Dorr LLP

(57) ABSTRACT

Preferred embodiments of the invention provide a system for, and method of, exploring relationships in data stored in a computer readable medium. Under one preferred set of embodiments, sets of data are maintained in a computer readable medium and include at least one intensional expression and one extensional expression of at least one set resulting from an evaluation of a first query. A second query is transformed into a set program. It is then determined whether a sub-expression of the set program is satisfied by a maintained set. If so, the sub-expression is removed from the set program and the maintained set that satisfies the sub-expression of the set program is used. Under another preferred set of embodiments, a query is received having at least one operator chosen from a set of operators that includes relational operators and having at least one input and output associated with the operator and defined as a table having at least one domain having a type associated therewith. The query is transformed into a set program having at least one operation structure, corresponding to the operator. An execution context is then analyzed to automatically select an operation structure from a set of operation structures corresponding to the operator so that the selected operation structure may be included in the set program.

19 Claims, 7 Drawing Sheets

U.S. PATENT DOCUMENTS

| | | | |
|---|---|---|---|
| 5,574,900 | 11/1996 | Huang et al. | 395/601 |
| 5,590,319 | 12/1996 | Cohen et al. | 395/604 |
| 5,590,321 | 12/1996 | Lin et al. | 395/610 |
| 5,615,341 | 3/1997 | Agrawal et al. | 395/210 |
| 5,630,124 | 5/1997 | Coyle, Jr. et al. | 395/614 |
| 5,655,080 | 8/1997 | Dias et al. | 395/200.32 |
| 5,655,116 | 8/1997 | Kirk et al. | 395/601 |
| 5,664,171 | 9/1997 | Agrawal et al. | 395/602 |
| 5,664,172 | 9/1997 | Antoshenkov | 395/604 |
| 5,666,524 | 9/1997 | Kunkel et al. | 395/603 |
| 5,668,986 | 9/1997 | Nilsen et al. | 395/610 |
| 5,687,369 | 11/1997 | Li | 395/619 |
| 5,963,932 * | 10/1999 | Jakobsson et al. | 707/2 |
| 6,006,224 * | 12/1999 | McComb et al. | 707/5 |

OTHER PUBLICATIONS

Childs D.L., XTDS Set–Theoretic Development System Interactive Operations Guide, Version 1.0—Pre–Release Draft, Copyright Oct. 1, 1996 by Integrated Information Systems, Ann Arbor, MI (111 Pages).

Childs, D.L., Extended Axiomatic Set Theory For Modelling Mathematically Sound Software Systems, Draft Dated Apr. 2, 1991, Work Support, in Part, Through Research Contract withHewlett–Packard Laboratories (21 Pages).

Childs, D.L., Extended Axiomatic Set Theory A Focus on Functions, Draft Dated Mar. 26, 1994 (47 Pages).

Harinarayan et al., 1995 Database Theory, ICDT 1995, "Optimization Using Tuple Subsumption".

Beeri et al., 1993 Proceedings of the ACM SIGMOD International Conference on Management of Data, "On the Power of Algebras with Recursion".

Kelb, M. et al., 1997 Tools and Algorithms for the Construction of Analysis of Systems, "A Flexible Toolset for Monadic Second–Order Logic".

Bonner, A.J., 1997 Journal of Logic Programming, "Intuitionistic Deductive Databases and the Polynomial Time Hierarchy".

Cadoli et al., 1997 IEEE, Vol. 9, No. 3, "Default logic as a Query Language".

Ceri et al., 1989 IEEE, Vol. 1, No. 1, "What you Always Wanted to Know About Datalog (And Never Dared to Ask)".

Kieman et al., 1990 ACM SIGMOD International Conference on Management of Data, "Making Deductive Database a Practical Technology: a step forward".

Ludascher et al., 1997 PODS Sixteenth ACM SIGACT–SIGMOD–SIGART Symposium on Principals of Database Systems, "Referential Actions a Logical Rules".

Wood, P.T., 1995 PODS Fourteenth ACM SIGACT–SIGMOD–SIGART Symposium on Principals of Database Systems, "Magic Factoring of Closure Programs".

Levy et al., 1995 PODS Fourteenth ACM SIGACT–SIGMOD–SIGART Symposium on Principals of Database Systems, "Semantic Query Optimization in Datalog Programs".

Chen et al., 1993 PODS Twelfth ACM SIGACT–SIGMOD––SIGART Symposium on Principals of Database Systems, "Query Evaluation Under the Well Founded Semantics".

Gogolla, M., 1990 SIGMOD Record, vol. 19, No. 1, "A Note on the Translation of SQL to Tuple Calculus".

Creasy, P., 1989 Proceedings of the Fifteenth International Conference on Very Large Databases, "ENIAM: A More Complete Conceptual Schema Language".

Griffin et al., 1997 SIGMOD Proceedings ACM SIGMOD International Conference on Management of Data, "A Framework for Implementing Hypothetical Queries".

Sagonas et al., 1994 Proceedings of the ACM SIGMOD International Conference on Management of Data, "XSB as an Efficient Deductive Database Engine".

Ramakrishnan et al., 1993 Proceedings of the ACM SIGMOD International Conference on Management of Data, "Implementation of the Coral Deductive Database System".

Widom et al., 1990 ACM SIGMOD International Conference on Management Data, "Set–Oriented Production Rules in Relational Database Systems".

Mumick et al., 1994 Proceedings of the ACM SIGMOD International Conference on Management of Data, "Implementation of Magic–Sets in Relational Database System".

Pirahesh et al., 1992 Proceedings of the ACM SIGMOD International Conference on Management of Data, "Extensible/Rule Based Query Rewrite Optimization in Starburst".

Seshadri et al., 1996 Proceedings of the ACM SIGMOD International Conference on Management of Data, "Cost-–Based Optimization of Magic; Algebra in Implementation".

Mumick et al., 1990 Proceedings of the ACM SIGMOD International Conference on Management of Data, "Magic is Relevant".

Borgida et al., 1993 Proceedings of the ACM SIGMOD International Conference on Management of Data, "Loading Data into Description Reasoners".

Aiken et al., 1992 Proceedings of the ACM SIGMOD International Conference on Management of Data, "Behavior of Database Production Rules: Termination, Confluence, and Observable Determinism".

Cluet et al., 1992 Proceedings of the ACM SIGMOD International Conference on Management of Data, "A General Framework of the Optimization of Object–Oriented Queries".

Christophides et al., 1996 Proceedings of the ACM SIGMOD International Conference on Management of Data, "Evaluating Queries with Generalized Path Expressions".

Goel et al., 1996 Proceedings of the ACM SIGMOD International Conference on Management of Data, "SQL Query Optimization: Reordering for a General Class of Queries".

Fegaras et al., 1995 Proceedings of the ACM SIGMOD International Conference on Management of Data, "Towards an Effective Calculus of Object Query Languages".

Cacace et al., 1990 Proceedings of the ACM SIGMOD International Conference on Management of Data, "Integrating Object–Oriented Data Modeling with a Rule–Based Programming Paradigm".

Libkin et al., 1994 PODS Thirteenth ACM SIGACT–SIGMOD–SIGART Symposium on Principles of Database Systems, "New Techniques for Studying Set Languages, Bag Languages and Aggregate Functions".

Bertino et al., 1996 PODS Fifteenth ACM SIGACT–SIGMOD–SIGART Symposium on Principles of Database Systems, "Static Analysis of Intensional Databases in U–Datalog".

Duschka et al., 1997 PODS Sixteenth ACM SIGACT–SIGMOD–SIGART Symposium on Principles of Database Systems, "Answering Recursive Queries Using Views".

Daly W.G., 1991 The Proceedings of the Ninth British National Conference on Databases, "Graphical Interfaces for Database Management".

Cooper et al., 1992 $10^{th}$ British National Conference on Databases, BNCOD 10, "A Graphical Data Modeling Program with Constraint Specification and Management".

Madurapperuma et al., 1997 15$^{th}$ British National Conference on Databases, BNCOD 15, "Customizable Visual Query Interface to a Heterogeneous Database Environment: A Meta–Programming Based Approach".

Lee et al., 1995 Higher Order Logic Theorem Proving and Its Applications, "Semantic Query Optimization in OODB Systems".

Guting, R.H., 1989 Proceedings of the Fifteenth International Conference on Very Large Databases, "Gral: An Extensible Relational Database System for Geometric Applications".

Llirbat et al., 1997 Proceedings of the ACM SIGMOD International Conference on the Management of Data, "Eliminating Costly Redundant Computations from SQL Trigger Executions".

Gardarin et al., 1995 Proceedings of the ACM SIGMOD International Conference on Management of Data, "A Functional Execution Model of Object Query Languages".

Watters, A., 1993 Proceedings of the ACM SIGMOD International Conference on Management of Data, "Interpreting a Reconstructed Relational Calculus: Extended Abstract".

Blakely et al., 1993 Proceedings of the ACM SIGMOD International Conference on Management of Data, "Experiences Building the Open OODB Query Optimizer".

Lin et al., 1997 Elsevier Science, "How to progress a database".

Chen et al., 1995 Database Theory ICDT '95, "Sorted HiLog: Sorts in Higher–Order Logic Data Languages".

Benedikt et al., 1996 PODS Fifteenth ACM SIGACT–SIGMOD–SIGART Symposium on Principles of Database Systems, "Verifiable Properties of Database Transactions".

Jagadish et al., 1995 PODS Fourteenth ACM SIGACT–SIGMOD–SIGART Symposium on Principles of Database Systems, "View Maintenance Issues for the Chronicle Data Model".

Libkin, L., 1995 PODS Fourteenth ACM SIGACT–SIGMOD–SIGART Symposium on Principles of Database Systems, "Normalizing Incomplete Databases".

Wong et al., 1993 PODS Twelfth ACM SIGACT–SIGMOD––SIGART Symposium on Principles of Database Systems, "Context–Based Synchronization: An Approach Beyond Semantics for Concurrency Control".

Wasch et al., 1996 IEEE Sixth International Workshop on Research Issues in Data Engineering, "History Merging as a Mechanism for Concurrency Control in Cooperative Environments".

Mitschang et al., 1996 Sixth International Workshop on Research Issues In Data Engineering, "Design Management in CONCORD: Combining Transactions Management, Workflow Management and Cooperation Control".

DeWitt et al.,Communications of the ACM June 1992, vol. 35, No. 6, "Parallel Database Systems: The Future of High Performance Database Systems".

Grafe G., 1990 Proceedings of the ACM SIGMOD International Conference on Management of Data, "Encapsulation of Parallelism in the Volcano Query Processing System".

Ganguly et al., 1990 Proceedings of the ACM SIGMOD International Conference on Management of Data, "A Framework for the Parallel Processing of Datalog Queries".

Wolfson et al., 1990 Proceedings of the ACM SIGMOD International Conference on Management of Data, "A New Paradigm for Parallel and distributed Rule–Processing".

DeWitt et al., Dec. 1990 SIGMOD Record, vol. 19, No. 4, "Parallel Database Systems: The Future of Database Processing or a Passing Fad?".

Kamel et al., 1992 Proceedings of the ACM SIGMOD International Conference on Management of Data, "Paralle R–trees".

Ghandeharizadeh et al., 1992 Proceedings of the ACM SIGMOD International Conference on Management of Data, "A Performance Analysis of Alternative Multi–Attribute Declustering Strategies".

Hong, W., 1992 Proceedings of the ACM SIGMOD International Conference on Management of Data, "Exploiting Inter–Operation Parallelism in XPRS".

Ganguly et al., 1992 Proceedings of the ACM SIGMOD International Conference on Management of Data, "Query Optimization for Parallel Execution".

Shatdal et al., 1993 Proceedings of the ACM SIGMOD International Conference on Management of Data, Using Shared Virtual Memory for Parallel Join Processing.

Tseng et al., 1993 Proceedings of the ACM SIGMOD International Conference on Management of Data, "Parallel Database Processing on the KSR1 Computer".

Dewan et al., 1994 Proceedings of the ACM SIGMOD International Conference on Management of Data, "Predictive Dynamic Load Balancing of Parallel and Distributed Rule and Query Processing".

Hsaio et al., 1994 Proceedings of the ACM SIGMOD International Conference on Management of Data, "On Parallel Execution of Multiple Pipelined Hash Joins".

Baru et al., 1995 Proceedings of the ACM SIGMOD International Conference on Management of Data, "An Overview of DB2 Parallel Edition".

Wilschut et al., 1995 Proceedings of the ACM SIGMOD International Conference on Management of Data, "Parallel evaluation of multi–join queries".

Shatdal et al., 1995 Proceedings of the ACM SIGMOD International Conference on Management of Data, Adaptive Parallel Aggregation Algorithms.

Achyutu;ni et al., 1996 Proceedings of the ACM SIGMOD International Conference on Management of Data, "Two Techniques for On–Line Index Modification in Shared Nothing Parallel Databases".

Garofalakis et al., 1996 Proceedings of the ACM SIGMOD International Conference on Management of Data, "Multi––dimensional Resource Scheduling for Parallel Queries".

Brunie et al., Sep. 1996 SIGMOD Record, vol. 25, No. 3, "Control strategies for complex relational query processing in shared nothing systems".

Hasan et al., Sep. 1996 SIGMOD Record, vol. 25, No. 3, "Open Issues in Parallel Query Optimization".

Han et al., 1997 Proceedings of the ACM SIGMOD International Conference on Management of Data, "Scalable Parallel Data Mining for Association Rules".

Pramanik et al., Jul./Aug. 1997 IEEE, vol. 9, No. 4, "The NUMA with Clusters of Processors for Parallel Join".

Agrawal et al., Dec. 1996 IEEE, vol. 8, No. 6, "Parallel Mining of Association Rules".

Wang et al., Aug. 1996 IEEE, vol. 8, No. 4, "On the Complexity of Distributed Query Optimization".

Chen et al., Jun. 1996 IEEE vol. 8, No. 3, "Optimization of Parallel Execution for Multi–Join Queries".

Spiliopoulou et al., Jun. 1996 IEEE, vol. 8, No. 3, "Parallel Optimization of Large Join Queries with Set Operators and Aggregates in a Parallel Environment Supporting Pipeline".

Boral et al., Mar. 1990 IEEE vol. 2, No. 1, "Prototyping Bubba, A Highly Parallel Database System".

Lakshmi et al., Dec. 1990 IEEE vol. 2, No. 4, "Effectiveness of Parallel Joins".

Guh et al., Aug. 1992 IEEE vol. 4, No. 4, "Efficient Management of Materialized Generalized Transitive Closure in Centralized and Parallel Environments".

Apers et al., Dec. 1992 IEEE, vol. 4, No. 6, "PRISMA/DB: A Parallel, Main Memory Relational DBMS".

Murphy et al., Apr. 1993 IEEE, vol. 5, No. 2, "Multiprocessor Join Scheduling".

Wolf et al., Dec. 1994 IEEE, vol. 6, No. 6, "New Algorithms for Parallelizing Relational Database Joins in the Presence of Data Skew".

Martin et al., Oct. 1994 IEEE, vol. 6, No. 5, "Parallel Hash–Based Join Algorithms for a Shared–Everything Environment".

Frieder et al., Aug. 1994 IEEE, vol. 6, No. 4, "Site and Query Scheduling Policies in Multicomputer Database Systems".

Lee et al., Dec. 1995 IEEE, vol. 7, No. 6, "Utilizing Page–Level Join Index for Optimization in Parallel Join Execution".

Thakore et al., Jun. 1995 IEEE, vol. 7, No. 3, "Algorithms for Asynchronous Parallel Processing of Object–Oriented Databases".

Ganguly et al., Jun. 1995 IEEE, vol. 7, No. 3, "Mapping Datalog Program Execution to Networks of Processors".

Zhang et al., Feb. 1995 IEEE, vol. 7, No. 1, "Data Partition and Parallel Evaluation of Datalog Programs".

Jadav et al., 1997 IEEE Seventh International Workshop on Research Issues In Data Engineering, "Batching and Dynamic Allocation Techniques for Increasing the Stream Capacity of an On–Demand Media Server".

Fisher, P.D., 1997 IEEE Thirteenth International Conference on Data Engineering, "System Design for Digital Media Asset Management".

DeVries, P, 1996 IEEE Twelfth International Conference on Data Engineering, "Media Asset Management: Managing Complex Data as a Re–Engineering Exercise".

Ishikawa et al., 1996 Twelfth International Conference on Data Engineering, "A Next–Generation Industry Multimedia Database System".

Hara et al., 1996 IEEE Twelfth International Conference on Data Engineering, "Hypermedia Database "Himotoki" and Its Applications".

Ozsoyoglu et al., 1996 IEEE Twelfth International Conference on Data Engineering, "Automating the Assembly of Presentations from Multimedia Databases".

Gibbs et al., 1993 IEEE Ninth International Conference on Data Engineering, "Audio/Video Databases: An Object–Oriented Approach".

Lowe et al., 1995 DASFAA Fourth International Conference on Database Systems for Advanced Applications, "A Formal Model for Databases of Structured Text".

Ryu et al., 1997 World Scientific Database Systems for Advanced Applications, "A Multimedia Query Language for Handling Multi–Structure Information".

Schwarz et al., 1994 IEEE Tenth International Conference on Data Engineering, "Managing Change in the Rufus System".

Peters et al., 1995 IEEE Eleventh International Conference on Data Engineering, "Axiomatization of Dynamic Schema Evolution in Objectbases".

Gyssens et al., 1996 PODS Fifteenth ACM SIGACT–SIGMOD–SIGART Symposium on Principles of Database Systems, "Tables as a Paradigm for Querying and Restructuring".

Mendelzon et al., 1994 PODS Thirteenth ACM SIGACT–SIGMOD–SIGART Symposium on Principles of Database Systems, "Object Migration".

Mehrotra et al., 1992 PODS Eleventh ACM SIGACT–SIGMOD–SiGART Symposium on Principles of Database Systems, "Ensuring Transaction Atomicity in Multidatabase Systems".

Breitbart et al., 1992 IEEE Research Issues on Data Engineering: Transcation and Query Processing, "Strong Recoverability in Multidatabase Systems".

Scheuermann et al., 1992 IEEE Research Issues on Data Engineering: Transaction and Query Processing, "A Deadlock Checkpointing Scheme for Multidatabase Systems".

Koh et al., 1995 IEEE Fifth International Workshop on Research Issues in Data Engineering–Distributed Object Management, "A Mapping Strategy for Querying Multiple Object Databases with a Global Object Schema".

Elshiewy, N., 1995 IEEE Fifth International Workshop on Research Issues in Data Engineering–Distributed Object Management, "MAKBIS: Coordinated Access to Heterogeneous and Autonomous Information System".

Schaad et al., 1995 IEEE Fifth International Workshop on Research Issues in Data Engineering–Distributed Object Management, "Implementation and Performance of Multi-–Level Transaction management in a Multidatabase Environment".

Kanonkluk et al., 1995 IEEE Fifth International Workshop on Research Issues in Data Engineering–Distributed Object Management, "A Dynamic Framework to Actively Support Interoperability in Multidatabase Systems".

Cochinwala et al., 1993 IEEE Third International Workshop on Research Issues in Data Engineering, "A Distributed Transaction Monitor".

Ahmed et al., 1993 IEEE Third International Workshop on Research Issues In Data Engineering, "An Overview of Pegasus".

Albert et al., 1993 Third International Workshop on Research Issues in Data Engineering, "Automatic Importation of Relational Schemas In Pegasus".

Bouguettaya et al., 1993 IEEE Third International Workshop on Research Issues in Data Engineering, "Implementation of Interoperability in Large Multidatabases".

Venkatasubramian et al., 1997 IEEE Seventeenth International Conference on Distributed Computer Systems, "Load Management in Distibuted Video Servers".

Thomas et al., 1995 World Scientific Database Systems for Advanced Applications, "Implementing Dynamic Code Assembly for Client–Based Query Processing".

Tewari et al., 1996 IEEE Twelfth International Conference on Data Engineering, "High Availability in Clustered Multimedia Servers".

Levy et al., 1996 PODS Fifteenth ACM SIGACT–SIGMOD–SIGART Symposium on Principles of Database Systems, "Answering Queries Using Limited External Query Processors".

de By et al., 1995 IEEE Fifth International Workshop on Research Issues In Data Engineering–Distributed Object Management, "Functionally Specified Distributed Transactions in Co–operative Scenarios".

PCT International Search Report corresponding to International Application No. PCT/US99/21775; Authorized Officer; Fournier, C.; Date of Completion: Feb. 3, 2000; Date of Mailing: Feb. 16, 2000 (3 pages).

Godfrey, P. et al., "A Framework for Intensional Query Optimization", Workshop on Deductive Databases and Logic Programming/Joint Intl Conference and Symposium on Logic Programming, Sep. 1996, pp. 1–12.

Motro, A., "Using integrity constraints to provide intensional answers to relational queries", Proceedings of the Fifteenth International Conference on Very Large Data Bases, Amsterdam, Netherlands, Aug. 22–25, 1989, pp. 237–246.

Grahne, G. et al., 1997 Journal of Computer and System Sciences 54, "Knowledgebase Transformations", Article No. SS971454, pp. 98–112.

Chemiack, M. et al., Jun. 1996 SIGMOD Record, vol. 25, Issue 2, "Rule Languages and Internal Algebras for Rule–Based Optimizers", pp. 401–412.

Ayres, R. et al., Advances in Databases, 14th British National Conference on Databases BNCOD 14, Edinburgh, United Kingdom, Jul. 3–5, 1996 Proceedings, "Querying Graph Databases Using a Functional Language Extended with Second Order Facilities", pp. 189–203.

Gordin, D.N. et al., 1991 IEEE Proceedings The Seventh Conference on Artificial Intelligence Applications, "Set–Oriented Constructs for Rule–Based Systems", pp. 76–80.

Alsbbagh et al., 1992 IEEE Second International Workshop on Research Issues on Data Engineering: Transaction and Query Processing, "A Framework for Multiple–Query Optimization", pp. 157–162.

Ross, K., 1992 ACM Press Proceedings of the Eleventh Annual ACM SIGACT–SIGART Symposium on Principals of Database Systems, "Relations with Relation Names as Arguments: Alebra and Calculus", pp. 346–353.

Guting, R., Jun. 1993 SIGMOD Record, vol. 22, Issue 2, "Second–Order Signature: A Tool for Specifying Data Models, Query Processing, and Optimization", pp. 277–286.

DeMichel et al., 1993 IEEE Ninth Annual Conference on Data Engineering, Apr. 19–23, 1993, "Polyglot: Extensions to Relational Databases for Sharable Types and Functions in a Multi–Language Environment", pp. 651–660.

Bucci, G. et al., Fall 1994 IEEE MultiMedia, "Sharing Multimedia Data Over a Client–Server Network", pp. 44–54.

Yoshitaka, A. et al., Winter 1994 IEEE MultiMedia, "Knowledge–Assisted Content–Based Retrieval for Multimedia Databases", pp. 12–20.

Carey, M.L. et al, 1995 IEEE RIDE–DOM '95, Fifth Annual Workshop on Research Issues in Data Engineering–Distributed Object Management, "Towards Heterogeneous Multimedia Information Systems: The Garlic Approach"pp. 124–131.

Imielinski, T. et al., 1984 IEEE 4th Annual Jerusalem Conference on Information Technology (JCIT), Next Decade in Information Technology, "Towards a Flexible User Interface to Relational Database Systems: Processing Simple Second Order Queries", pp. 358–367.

Zhang et al., Feb. 1995 IEEE Transactions on Knowledge and Data Engineering, vol. 7, No. 1, "Data Partition and Parallel Evaluation of Datalog Programs", pp. 163–176.

Wilschut et al., Jun. 1995 SIGMOD Record, vol. 24, Issue 2, "Parallel Evaluation of Multi–Join Queries", pp. 115–126.

Gunter, E. et al., Sep. 1994 Proceedings 5th International Conference, DEXA '94, Database and Expert Systems Applications, "OR–SML: A Functional Database Programming Language for Disjunctive Information and Its Applications", pp. 641–650.

Chen, W. et al., 1995 Proceedings 5th International Conference Database Theory–ICDT '95, "Sorted HiLog: Sorts in Higher–Order Logic Data Languages", pp. 252–265.

Gunter, E. et al, 1995 8th International Workshop on Higher Order Logic Theorem Proving and Its Applications, "Interfacing HOL90 with a Functional Database Query Language", pp. 170–185.

Benedikt, M. et al., 1996 IEEE Proceedings 11th Annual Symposium on Logic in Computer Science, "On the Structure of Queries in Constraint Query Languages", pp. 25–34.

Barsalou, T. et al, 1992 IEEE Eight International Conference on Data Engineering, "M(DM): An Open Framework for Interoperation of Multimodel Multidatabase Systems", pp. 218–227.

Alzahrani, R.M. et al., 1995 IEEE RIDE–DOM '95 Fifth International Workshop on Research Issues in Data Engineering–Distributed Object Management, "A Rule–Based Query Processor for a Heterogeneous Object–Oriented Database Environment—Overview", pp. 86–90.

Muth, P. et al., 1992 IEEE Second International Workshop on Research Issues on Data Engineering: Transaction and Query Processing, "How to Handle Global Transactions in Heterogeneous Database Systems", pp. 192–198.

Thimm, H. et al., 1996 IEEE Twelfth International Conference on Data Engineering, "δ–Sets for Optimized Reactive Adaptive Playout Management in Distributed Multimedia Database Systems", pp. 584–592.

Morishima et al., Advance Database Research and Development Series—vol. 6, 1997 World Scientific Database Systems for Advanced Applications '97, "A Data Modeling and Query Processing Scheme for Integration of Structured Document Repositories and Rational Databases", pp. 145–154.

Colajanni et al., 1997 IEEE Proceedings of the 17th Annual International Conference on Distributed Computing Systems, "Scheduling Algorithms for Distributed Web Servers", pp. 169–176.

Park, K.K. et al., 1995 IEEE RIDE–DOM '95 Fifth International Workshop on Research Issues in Data Engineering–Distributed Object Management, "System Abstraction and Interface for Interoperable Server Objects in OMEGA", pp. 132–139.

Ozden, B. et al., 1997 Proceedings of the Sixteenth ACM SIGACT–SIGMOD–SIGART Symposium on Principles of Database Systems, "Multimedia Support for Databases", pp. 1–11.

Widom J., Sep. 1992 SIGMOD Record, vol. 21, No. 3, "A Denotational Semantics for the Starburst Production Rule Language", pp. 4–9.

Childs, D. L., 1968 Fall Joint Computer Conference, "Description of a set–theoretic data structure" (paper), pp. 557–564.

Childs, D.L., 1969 Information Processing 68—North–Holland Publishing Company—Amsterdam, "Feasibility of a Set–Theoretic Data Structure a General Structure Based on a Reconstituted Definition of Relation", pp. 420–431.

Childs, D.L., Paper Entitled, "Extended Set Theory A General Model for Very Large Distributed, Backend Information Systems" (21 pages).

Mitschang, B., "Anfrageverarbeitung in Datenbanksystemen: Entwurfsund Implementierungskonzepte", ISBN 3–528–05488–3, Braunschweig, Germany, Vieweg Verlag, 1995 pp. 66–71, 244–247 and 129–131.

Chamberlin, D. D., "Using the new DB2: IBM's object–relational database system", ISBN 1–55860–373–5, Morgan Kaufmann Series in Data Management Systems, Morgan Kaufmann Publishers, 1996, pp. 647–651.

Roussopoulos, N. et al., "The ADMS Project: Views R Us",, IEEE Data Engineering Bulletin, vol. 18, No. 2, Jun. 1995, pp. 19–28.

* cited by examiner

CACHING OPTIMIZATION WITH DISK AND/OR MEMORY CACHE MANAGEMENT

This application is related in subject matter to co-pending U.S. patent application Ser. No. 09/166,556, filed on Oct. 5, 1998, by Michael Forster for "DATA EXPLORATION SYSTEM AND METHOD". The disclosure of application Ser. No. 09/166,556 is incorporated herein by reference and assigned to a common assignee herewith.

BACKGROUND OF THE INVENTION

1. Field of the Invention

This invention relates to database, data warehouse, and data mart technology and, more particularly, to an improved system and method for exploring information relationships in data.

2. Discussion of Related Art

Modern computing databases have extremely large quantities of data. Businesses often desire to discover information relationships in this data to make better informed business decisions. In this regard, "data warehousing" is used to describe computing technologies used to discover relationships within a database, and "data mart" is used to describe technologies for a subject-specific data warehouse.

To date, data warehousing and data mart tools have been undesirable because of their high cost, both in infrastructure and human capital. Modern systems are effectively customized database applications. Consequently, exploring relationships usually involves the creation of new, custom queries and typically requires a management information systems (MIS) professional, or other programming personnel, to implement the query. If a user, for example, in a marketing department, wishes to investigate a potential new information relationship, he or she is often forced to cross department boundaries and as a result almost invariably experiences undesirable delays. As a result, much of the data is under utilized because many relations are never explored because the delay outweighs the benefit.

Moreover, because modern data warehouse systems are effectively customized database applications, they often inherit inefficiencies from the underlying database. These inefficiencies may be information related (e.g., inherently precluding certain lines of questioning because the application is tightly-coupled to the database's schema) or performance related (e.g., the system may be optimized for a certain type of transactional access that does not perform well to the accesses involved in the data warehousing queries).

More specifically, concerning performance related issues, most systems rely on the relational data model (RDM). The performance of a RDM implementation is typically limited by its "access method." Commercially-available systems, for example, have their software logic rely on an access method (e.g., "B+tree") that requires multiple accesses to storage (e.g., memory or disk) to obtain a given record. Some of the accesses are to reference structures that are used to effectively "point to" the data of interest (e.g., indices or hierarchies of linked lists). Sometimes, these reference structures can get so large that portions of the structure must reside on disk. Thus a given request for a database record may involve multiple disk storage requests. Moreover, the database operation algorithms are tightly bound to the access method. That is, the algorithm itself has been optimized to the access method and is thus dependent on the existence of the access method. Much of the literature on database performance explicitly or implicitly assumes the existence of such access methods.

Aside from the above limitations, most commercial systems are limited to the actual data within the database. The systems cannot query other important data elements such as the schema, the meta data, or the data dictionary without significant custom programming. Consequently, significant knowledge, e.g. useful queries, is not reported or available for use within such systems.

The above difficulties are exacerbated in the context of data residing on disparate databases.

Alternative approaches have been attempted. Childs, for example, discusses set-theoretic approaches in *Feasibility of a Set-Theoretic Data Structure: a General Structure Based on Reconstituted Definition of Relation*, Information Processing 68, Edinburgh, 1968; *Description of a Set-Theoretic Data Structure*, Fall Joint Computer Conference, San Francisco, 1968; and *Extended Set Theory: a General Model for Very Large, Distributed, Backend Information Systems*. He is believed to have developed a system (STDS and XTDS) in which a user may express queries directly from a small set of set operators.

SUMMARY

Preferred embodiments of the invention provide a system for, and method of, exploring relationships in data stored in a computer readable medium. Under one preferred set of embodiments, sets of data are maintained in a computer readable medium and include at least one intensional expression and one extensional expression of at least one set resulting from an evaluation of a first query. A second query is transformed into a set program. It is then determined whether a sub-expression of the set program is satisfied by a maintained set. If so, the sub-expression is removed from the set program and the maintained set that satisfies the sub-expression of the set program is used.

Under another preferred set of embodiments, a query is received having at least one operator chosen from a set of operators that includes relational operators and having at least one input and output associated with the operator and defined as a table having at least one domain having a type associated therewith. The query is transformed into a set program having at least one operation structure, corresponding to the operator. An execution context is then analyzed to automatically select an operation structure from a set of operation structures corresponding to the operator so that the selected operation structure may be included in the set program.

DETAILED DESCRIPTION

A preferred embodiment of the invention provides a data exploring system and method that allows users to express queries diagrammatically and with many declarative or calculus aspects. This expression is evaluated to a form used by a set-based server engine. The arrangement among other things allows queries to be expressed as a function of set membership and allows implementations to be proved correct. Among its many advantages, preferred embodiments allow users to query any available databases regardless of structure, origin, or size, singly or in combination with other data sources; to analyze any and all parts of the data including the schema and query information; and to query free-form text. Because customized database applications, queries and schemas are avoided the system may be setup and used quickly and new lines of questioning may be created with more flexibility than existing systems and without the necessity of MIS involvement.

Overview of the Preferred Client-Server Model

Figure 1:
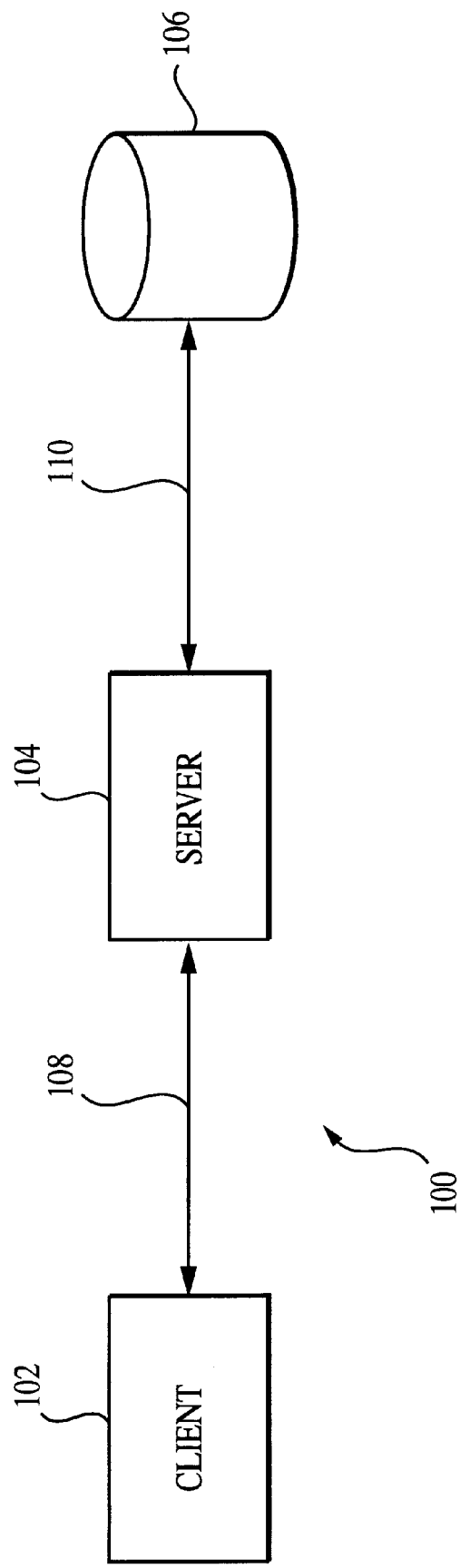
FIG. 1 shows a preferred client-server embodiment of the invention at a high-level abstraction.

FIG. 1 shows a preferred embodiment of the invention at a high level of abstraction. The system 100 follows a client-server arrangement having a client 102, a server 104, and one or more data sources 106 a–n holding the data to be explored, which may be imported or attached as described below.

The client 102 and server 104 communicate over a computer network 108 according to a predefined protocol (e.g., TCP/IP). The communication is based on packets that encode various requests and that provide data to and from the client and server. The server communicates with a data source 106 over a link 110 according to a defined protocol, such as ODBC. The data sources 106 a–n provide the data to be explored, though the data to be explored may also include information stored in "workspaces" in server memory. Moreover, the "data" within the data source may include database schema information, queries, or the like and may be organized as individual files or organized as libraries.

Preferably, client 102 is "thin," providing a graphical front-end that allows a user (1) to create a diagrammatic representation of a query, (2) to view query results and other workspace information, and (3) to submit queries to be solved. The client 102 has minimal intelligence concerning the query language ("outer language"). Instead, its intelligence is primarily directed to graphics. It has logic to graphically construct and manipulate boxes to represent outer language operators, or operations, and lines connecting boxes to represent data flow dependence. It also has logic to present workspace information such as query results.

The server 104 is preferably "thick," having the intelligence to manage workspaces and to evaluate and solve outer language queries. (A later section "Operators and Types" describes the outer language operators of a preferred embodiment.) In this fashion, most of the system's intelligence is localized to the server 104. Consequently, the client 102 should not need updates in response to changes in the data exploration system or the underlying query language, and the server should not need updates in response to changes in the data presentation techniques or the system's graphical user interface (GUI).

The client 102 and the server 104 cooperate in the construction of a query in response to user actions. A user, for example, performs graphical actions such as the selecting, dragging, or dropping of an operator icon from a palette on to a query window. (The client, having no built in intelligence about the outer language or system, is informed of the set of operations implemented by the server through a collection of server-provided identifying codes.) In response, the client 102 sends messages to the server 104, providing the operator's identifying code and other information indicative of the user action. The server 104 analyzes the messages and responds by sending messages to the client, providing "pattern" and other information indicating how a corresponding operator block should be drawn (e.g., indicating the number of input and output connectors for the operator block and the number of items to be drawn on each connector). If a user connects an operator block to another operator block or to an iconic representation of a data source, the client sends indicative messages to the server, which updates a corresponding internal representation of the query (called a "parts list") to reflect the connection. Sometimes the modification of a given block or connection can cause the server to propagate the change through the parts list.

In short, the query constructed is a graph of operations in which "tables" (i.e. depicted sets either DSets or DPSets, discussed below) flow between operators. The outer language follows a functional, applicative paradigm that, among other things, supports parameterized queries and recursion. The query (or program) may include one or more constraints between columns within a table, columns of different tables, or a column and a scalar. As will be explained below, these constraints imply row selection if they are within a table, or a join operation (e.g., inner or theta join) if they are between tables.

When the user is satisfied with the query, he or she may "submit" it to be solved by the server 104. More specifically, the user will cause the client 102 to send an indicative message to the server, instructing it to solve the identified query. The server 104 will then evaluate the query into a semantically equivalent set of operation "primitives." (This process, as will be explained below, will generate intermediate expressions of the query. Moreover, through the implementation of the primitives' algorithms, this semantic equivalence is provably correct, not merely asserted as is common in the RDM art.) The server will then submit the primitives to an internal server engine to be solved. The primitives (and particularly their semantics) and the algorithms used by the internal engine to execute the primitives have been found to be particularly efficient. This efficiency is observed both in direct performance (e.g., the algorithmic efficiency of an Inner Join implementation) and in the system's amenability to both local and global optimizations, exploiting certain characteristics of the primitives and algorithms. For example, some optimizations exploit the language's and algorithm implementation's characteristic of preserving the "sortedness" of data across an operation. More specifically, this preservation of sortedness may be exploited in detecting and removing redundant Sort operations within a query. During the above process, the server may send status messages to the client, indicating the progress of the solution process. Once it is solved, the user may cause the client to present the results.

The server 104 also maintains "workspaces." A workspace organizes data such as related tables (sets of data) and queries (called QRSets). A given workspace effectively provides (1) a namespace for the related data and (2) a user view into the system, including a history of prior queries (i.e., a knowledge base). The workspace also provides a collection of "managers" to facilitate the use of the related data and queries.

Preferred Data Structures

A preferred embodiment of the server 104 uses the following data structures for organizing data in server memory and/or on attached storage 106, such as disks or tape.

Figure 2:
FIG. 2 shows an XSet data structure according to a preferred embodiment of the invention.

An "XSet" is used directly by the server as a unit of access and manipulation and also in the construction of compound structures. An XSet is a type-less array of data storage units (e.g., bytes). Each XSet corresponds to a file that provides persistence for that XSet's data. Each XSet is arranged as shown in FIG. 2. (There is an exception to this arrangement when an XSet is included in a compound structure called a DPSet, described below.) The header includes information indicating the number of elements in the XSet (i.e., the "cardinality"); the width of each element in data units; the size of the header; the identity of the XSet; the version number of the XSet; and other state information. A preferred embodiment maintains the following XSet state information to represent the XSet's access type and status information: the XSet is new, open, closed, read only, writable, the existing file should be replaced on new file operations, the set should be handled on disk and memory, or memory only, the XSet is unsavable, the XSet is marked for deletion and an indication that an XSet's data is stored externally (e.g., by an attached, non-writable file). A preferred embodiment mirrors the header information in the workspace managers.

Because under a preferred embodiment there is no inherent "meaning" (or type) to an XSet, meaning is imputed from separate entities, either a "Depictor" or an "RShip," depending on the stage of query construction, evaluation or solution. A Depictor is analogous to a schema and includes data indicating how an XSet's data should be portrayed or understood (at least in a specific instance). A Depictor includes column name, column type identifier, column type width, and column type format, as well as possible data delimiters in the XSet (e.g., spaces, commas, special characters, etc.). Delimiters are used on partitioned data, for example, DPSets with attached data from outside the workspace. An RShip is used in the context of an operation's execution and is created dynamically during query solution. As will be discussed below, it is used to provide data abstraction so that the operation primitive algorithms may be implemented with minimal or no data type dependencies.

A "Depicted Set" (or "DSet") is a compound data structure that combines an XSet and a Depictor. DSets correspond to the entities used by users. That is, these are the structures users typically use as inputs to queries and that they view. A user typically wants to impute some interpretation on the data being explored and might specify, as a first analysis, that the Depictor should effectively mirror the interpretation supplied by a database schema of the data being explored. However, the separate structures allow users to easily modify a Depictor (and consequently a DSet) and thus cause the system to analyze the data differently, e.g., consider a first column as text, and then later as an integer. For implementation simplicity, an exemplary embodiment has a given column in a DSet having the same width in each row of the DSet. Moreover, Depictors are also constructed by the software logic. For example, an output of an operation will be a DSet, the Depictor of which will be formed either from user input or from software logic using default Depictor forming rules (e.g., output type equals left most input as viewed on screen.) A DSet may be represented in either "extensional" form or in "intensional" form. An extensional DSet is implemented as contiguous storage in which DSet members are stored sequentially, preferably without gaps. An intensional DSet is implemented with a stored "intension." The intension is an expression that when executed on the server yields the DSet in extensional form. (As will be explained below a preferred embodiment stores an expression called a "QRSet" as the intension.)

A "Depicted, Partitioned Set" (or "DPSet") refers to a DSet in which the data portion resides on disk, not in server memory or in a server controlled area on disk. More specifically, a DPSet is a compound data structure that includes a data XSet, a DSet for holding partitioning information, and a Depictor. The data XSet preferably does not include the header information identified above for normal XSets but it could under alternative embodiments. The DSet for holding partitioning information defines a layout of the data in the XSet file. This partitioning DSet has one row in it for every row in the DPSet and it has the same number of columns as the DPSet, plus one. The first column of the DPSet holds the byte offset of the start of the corresponding row in the XSet file. The rest of the columns specify the width in bytes of the columns of the DPSet on a row-by-row basis. The Depictor is a DSet which has one row for every column in the DPSet. Each row in the Depictor DSet defines the properties of the corresponding column in the DPSet, including column name, column type identifier, column type width, column type format, and storage information about a given domain. DPSets are advantageous in that they allow conversion and use to be postponed so that only the data that is actually needed will be read from the file.

A "parts list" is a compound data structure that is a collection of n-tuples. Each n-tuple corresponds to a query element as it is drawn on the screen (e.g., input, connector, operation block). The parts list's n-tuples contain data identifying the input and output connectors and the operation, but preferably with just enough information to describe the query as drawn on the display. They also contain data showing the input and output domain on connectors (more below).

A "QRSet" is a DSet representing a query. The Depictor specifies the entities used to represent a query, for example, including the part element type, its identification number, and the like. The Depictor for a QRSet has information about the parts list which represents a function (more below). The XSet portion of the QRSet's DSet holds the corresponding values, e.g., the value of the identification number. A QRSet is an "intensional" form of the DSet eventually solved, or derived, from the query. QRSets, being DSets, may be queried.

Server Architecture

Figure 3:
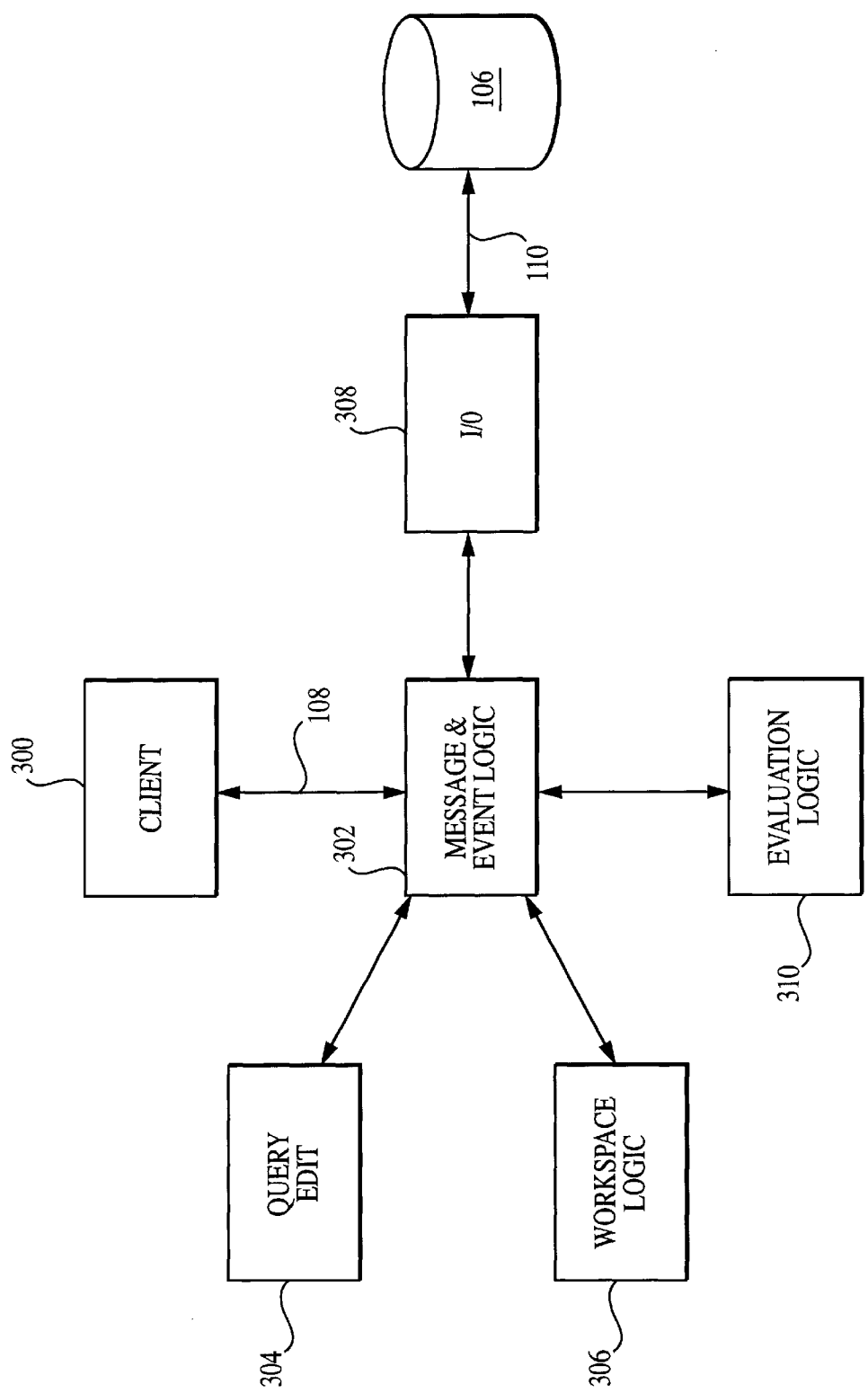
FIG. 3 shows server logic according to a preferred embodiment of the invention.

FIG. 3 shows the server architecture 300. The server 104 includes a message and event handling system 302, a query editing system 304, a workspace system 306, an input-output (I/O) system 308, and a query evaluation system 310. Each of the systems 302–310 is preferably constructed with software logic and associated data structures and is executable on server 104 as a separate thread.

The message and event handling system 302 is a queue-based system that receives messages and events from the client 102 and the other server systems 304–310. An event identifies the target of the event and the event itself, and it may include information corresponding to the event. Most of the inter-system communication is event based, though some is implemented with direct system calls. (As will be explained below, some systems, notably the evaluations system 310, also use intra-system event queues.)

The query editing system 304 receives the editing messages from the client 102, via event system 302, and constructs a "parts list" as an internal representation of a user's query. The parts list involves a collection of query operations in which each is associated with inputs and outputs that are (1) table constants, (2) table variables, or (3) scalars. A table constant is a table that exists at the time the query is defined, that is, attached or imported tables, or tables in a workspace, or more specifically tables the intensions of which already exist. A table variable, on the other hand, is one that does not yet exist at the time the query is defined. It may include, for example, the output of another operation in the query (e.g., one higher in the query from the perspective of data flow). A table variable may be considered as an intermediate result of a sub-expression of a query expression. In response to client editing requests, the editing system 304 sends back to the client 102 parts list information indicative of the updated, edited query. This information is used by the client to present the query diagram. A given user action may affect multiple defined operations in a given query. The editing logic detects such dependencies and ensures that query edit requests are propagated through the query to reflect the edit.

The workspace system 306 provides a namespace in which data and queries are related. A suite of workspace managers operates on, or manipulates, that data. In short, the managers are generally organized according to the manipulation's target. For example, some manipulations target a given kind of data, such as an XSet, DSet, or DPSet. Other targets are defined by how the data is used: Depictors are used to describe the column properties of a DSet; editable outer language programs are used to define a query; and executable inner language programs are used to solve a query. There are also managers that record inter-set dependencies, a DSet's intension (i.e., QRSet); progress message addresses; set openings; set access control; set interest; set usage; and a workspace's users. The managers, besides being responsible for the above, also monitor access to determine when a set is no longer needed and in response eliminates such sets.

The workspace system 306 also monitors and detects when sets have changed. One set's definition may rely on another set. This other set may change either because an input file has changed or because of an operation on the server. The workspace system 306 maintains data structures reflecting this inter-set dependence and indicates when a set has changed. Either manual (i.e., in response to a user action) or automatic propagation may be used to update affected sets.

Sets have associated access or viewing privileges. A preferred embodiment organizes access based on arranging privileges to local (i.e., the creator), Project (i.e., a set of related users), and All (i.e., anyone).

As will be explained below, the tables are maintained, or "cached," and available to be used in certain optimizations during query evaluation and/or solving. The workspace managers consider the amount of memory available to the workspace and allocate that memory to tables. Preferably sets and tables are kept in "extensional" form; that is, the data itself resides in the workspace. However, dynamic run-time usage can require the workspace managers to effectively "swap out" the extensional form to storage but retain the "intensional" form, i.e., the query sub-expression that resulted in the data. Moreover, when there is no more interest in a set it may be deleted. Usage histories are maintained and considered by the workspace managers in determining which sets to swap out or delete. A preferred embodiment also factors the size of the set in determining a preference as to which set to keep in extensional form. In this fashion an XSet's cost is consider. Larger sets are more costly because more I/O bandwidth is consumed. Many other caching replacement algorithms may be added or substituted.

An intension manager is used to manage QRSets, for example, to match identical or semantically equivalent intensions during global optimization (more below).

The input-output (I/O) system 308 cooperates with the server's operating system to read and write data from storage. It abstracts the operating system from the rest of the server logic described in this application.

The query evaluation system 310 transforms the user-created query into a semantically equivalent form, constructed of operation "primitives." These primitives are operations that are executable by a server engine. In short, the primitives generally have more restricted operation assumptions than the user query (e.g., input arguments must be in a prescribed order) and are set-theoretic, rather than relational. The outer language, though having relational model characteristics, also contains set theoretic aspects. Thus queries may be expressed in a form emphasizing set membership. As a consequence, the outer language has both algebraic aspects and more powerful calculus aspects.

The Query Evaluation System

Figure 4:
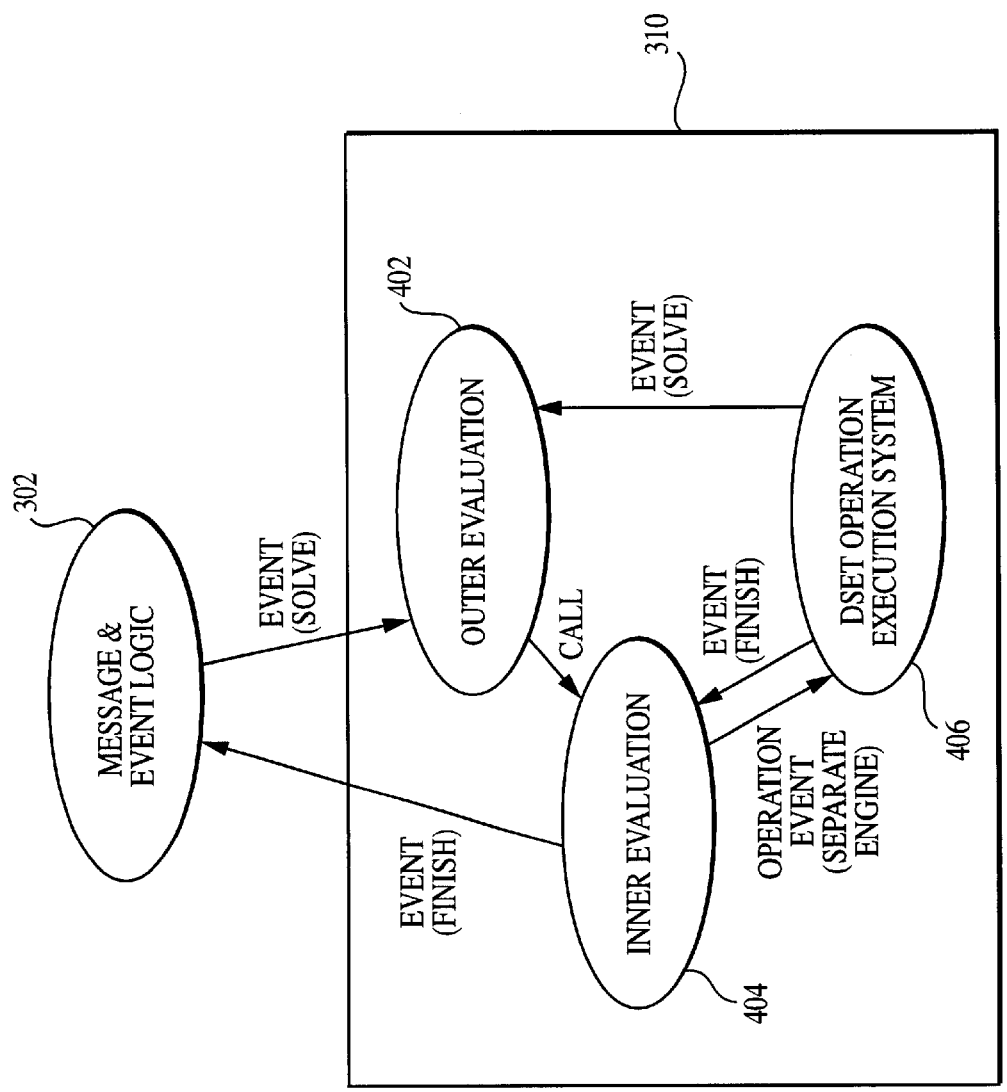
FIG. 4 shows query evaluation logic according to a preferred embodiment of the invention.

The query evaluation system 310 transforms the server's internal representation of an outer language query into a semantically equivalent set of operation primitives. In the process, several intermediate expressions are formed. These primitives are then executed by an internal engine, under the control of the evaluation system 310. As show in FIG. 4, the query evaluation system 310 cooperates with the event and message handling system 302, described above, and includes an outer evaluation system 402, an inner evaluation system 404, and a DSet operation execution System 406.

The event and message handling system 302, as outlined above, receives and handles messages and events from the various server systems 304–310. In the instant context, these events include client-originated messages identifying a particular query and requesting that it be solved and client-destined messages indicating the status of a particular query's execution. These events also include messages to and from the workspace manager 306 to record interest in sets and their usage and to determine whether the workspace manager 306 includes a set or superset as expressed by a set's intension. These events and messages also include requests to read and write data to storage 106 via input-output system 310. These latter events and messages may be partially mirrored to the workspace system 306 so that it may update set status accordingly.

The outer evaluation system 402 transforms the query from an outer language expression to an inner language expression. The inner evaluation system 404 transforms the inner language expression into a second inner language expression and then into a set of operation primitives and corresponding control structures (an "oper set"). An oper set is a collection of "opers" in which each oper identifies the operation primitive to be performed (e.g., Inner Join with inner language operation assumptions) and which describes the operation's input and output DSets. This oper set description includes control structures to identify the state of inputs and outputs (e.g., valid or invalid). These control structures are used to data flow schedule any "ready" opers (i.e., ones in which all inputs are valid, and outputs are defined). (Data flow scheduling is known, though not in the combination described.) The operations include a "switch" operator, which creates special "void" sets as outputs to "force" non-selected output dataflow paths to be skipped. This skipping occurs because all operators except the Accept operator degenerates into simple pass-through of void sets without attempting any calculation. The set handling logic that checks for ready opers sees that one of the inputs is void and marks that oper as if it had completed execution and copies void sets to outputs as necessary. The "Accept" logic checks if all of its inputs are ready (including void sets) and does a union of all inputs to generate an output. The oper set is used in invoking and is executed by the DSet operation execution system 406. The DSet operation execution system signals completion status to the inner evaluation system 404 to inform it of DSet operation execution system's status. The DSet operation execution system also invokes the outer evaluation system 402 to solve parameterized queries (or functions). A parameterized query has table variables, not table constants, as inputs. If a function is called (through the Evaluation operation) in a query, its definition must be instantiated, and in this regard, the outer evaluation system 402 is the entity responsible for evaluating such instantiation. The DSet operation execution system 406, however, is responsible for the actual execution of the overarching query and only it can determine when a function is to be called and it signals the outer evaluation system to evaluate an instance of the function definition. This allows for a recursive evaluation of the function definition. Thus, the DSet operation execution system must signal the outer evaluation system to instantiate a function.

Figure 5:
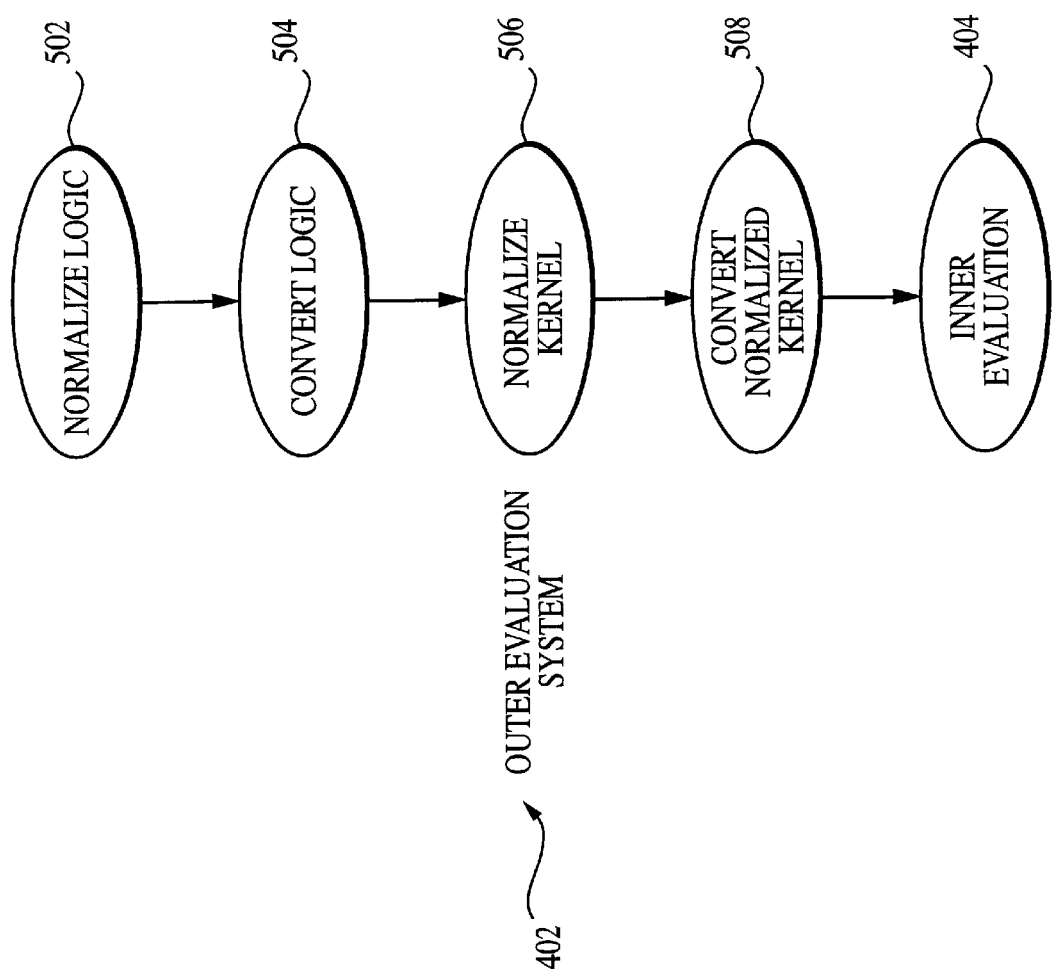
FIG. 5 shows outer language evaluation logic according to a preferred embodiment of the invention.

The outer evaluation system 402 is shown in FIG. 5 in more detail. The outer evaluation system includes logic 502 to normalize the outer language expression;

logic 504 to convert the normalized outer expression to a kernel version;

logic 506 to normalize the kernel version; and logic 508 to convert the normalized kernel version to an "inner program."

The combination of logic 502–508 uses a multiple pass approach, in which the expression is continually processed in passes until a pass results in no more normalizations or conversions. Items within the parts list are marked and unmarked to indicate whether a certain normalization or conversion has occurred to improve the performance of the processing.

The logic 502 to normalize the outer language expression processes the query to place the expression in a better form for conversion. The purpose of the normalization is to handle user "shorthands," i.e., expressions that are convenient to specify but which have certain implied meaning that needs to be made explicit.

More specifically, the normalization logic 502 ensures that all operations have properly defined input sets and if not it adds them. Additionally, logic 502 ensures that all "relator" operations (e.g., Less Than) have an associated type specified in the internal representation. This is done because the relator may have inputs of different explicit or implicit types, e.g., one being an integer and another being a floating point. The default relator type is assigned to that of the type of the "left" input, as connected in the user's query. The logic 502 also ensures that the various items in the query (i.e., input and output connectors, operators, etc.) have names and identification numbers (IDs) in sequence (e.g., 1... N with no gaps) to facilitate further processing. It also ensures that the parts lists includes information indicating the sort key ordering associated with a given DSet. This way the sort key ordering information is maintained for subsequent conversions and optimizations.

The logic 504 creates a "kernel version" of the query which is a simplified form of the outer language. In short, the kernel version does not support constraints. Thus, any use or implication of constraints in the user query must be handled by insertion of the appropriate operations into the kernel version. Also, the kernel version uses only a subject of the operators supported by the full outer language and it also uses a few operations that are not available to the user. This is done to create a version of the program (i.e., the kernel version) that can be executed more efficiently, while allowing the user to express queries with more convenient, expressive or intuitive operations. The logic 504 detects whether a query has multiple table constants on an input connector of a relator operation and, in response, defines a set to include the table constants and converts the query to refer to the new set, rather than the table constants. This is performed by inserting an operation into the kernel program called Constants to Set. (see "Operators and Types" section) It ensures that a relator's input arguments are in a prescribed order. If one input is a scalar and the other is a column reference, then the column reference is placed first. If both inputs are column references, the column reference with a "lower address" (i.e., based on set type, set identifier, and column identifier, in that order) is placed first. If the inputs are swapped as a result of the above, the operation relator is converted accordingly, e.g., Less Than converted to Greater Than.

The outer language allows user queries to use regular-expression pattern matching in expressing queries. To handle this, logic 504 also converts certain constraints involving regular-expression-pattern matching and the constraints' column references to an "intensional" regular-expression set and an Inner Join that joins the data to be matched with the set of all possible generated strings as expressed in the intensional form. This creates a state machine equivalent to the regular expression to programmatically describe a string of interest, and the state machine is implemented as a table, i.e., an intensional form for the string.

Logic 504 also detects when the constraints used in a query refer to DPSets and in such cases injects into the kernel program a corresponding Select Column and Select Row operators having the DPSets as input. Any other operators having a DPSet as an input are converted so that a DSet is formed from the DPSet and so that the kernel operator refers to the DSet.

Logic 504 also detects when constraint blocks in the outer language query imply Select Rows, Inner Joins, Inner Restricts, Theta Joins, Theta Restricts, or Concatenate Columns and in such cases it injects the corresponding operations into the kernel version. (The conversion logic here avoids the use of theta joins in cases where an inner join may be used.) For example, if an operation uses columns from different tables in the same input connector, logic 504 converts the operation to have columns from the same table by combining the prior two tables using an inserted Inner Join based on the equality constraints specified in the query for the two tables.

Logic 504 also ensures that certain input ordering is maintained (e.g., that table constants come after variables), transforming the operator if necessary. Logic 504 also transforms nested disjunctions (i.e., ORs).

More specifically, regarding the above paragraphs, the outer language allows queries to be created that have one or more constraints between (1) columns within a table, (2) columns of different tables, or (3) a column and a scalar value. These constraints imply row selection if they are within a table, or some kind of join (e.g., Inner or Theta) if they are between tables. To perform the above, logic 504 compares elements in the parts list with pre-programmed patterns (not to be confused with the patterns sent to client to describe how an operator block should be drawn). The recognition of such implied operating use conventional algorithms.

Logic 504 also transforms function calls (i.e., Evaluate) and expands "macro" operations. The actual instantiation of a function call is not performed until the query is being executed by the internal engine (more below), at which time the function call is identified by a query name. Regarding macro expansion, one exemplary embodiment implements Aggregate-By-Group and Concatenate Strings as macros. In the Aggregate-By-Group example, the macro is transformed into corresponding kernel operators that select rows for each group of constraints on the Aggregate-By-Group operator; Cross Products the name for that group with the selection; Unions the named selections; and Aggregates-By-Key the union adding the group name as the first key column. In the Concatenate String example, the operator is expanded into a graph of Binary-Concatenate-String operators.

Logic 504 also transforms constraint disjunctions on Select elements into a Union of the results of Select elements for each disjunct. For example, a Select having DPSet rows with two or more groups of constraints between column references and scalars is transformed into a Select having DPSet rows for just the first group of constraints, Select DPSet rows for the other groups of constraints and a Union of the outputs of these two Select row operators. As part of this group of conversions, an Aggregate-By-Key is converted into a graph of kernel operators that perform a keyed statistical aggregation operator for each statistical operator identified in the Aggregate-By-Key, and Unions the results.

After Logic 504 is finished converting the normalized program, the logic 506 to normalize the kernel version of the outer language expression analyzes the "data flow" of the query to verify that each operation potentially has enough information to be executed. This is done to determine whether the query is legitimate from a data flow perspective. A new QRSet is created and organized according to the data flow dependence as suggested by the query. The new QRSet also has its identifiers and names normalized to facilitate further processing.

After Logic 506 is finished, the logic 508 to convert the normalized kernel version to an "inner program" performs another set of optimizations and transformations to produce an inner program, or QRSet (this is not yet the set of operation primitives). Each operator in the outer program has at least one corresponding inner program operator. However, the operation assumptions between the outer and inner operations are not necessarily identical. For example, the Inner Join operator of the inner language assumes that its inputs are sorted, whereas the same operator in the outer language makes no such assumption. Consequently, the conversion logic 508 detects operations that do not have semantically equivalent inner forms and makes the necessary changes. In the example of Inner Join, this transformation would include the analysis to determine whether the inputs were necessarily sorted (e.g., because of a prior operation) and if the inputs were not necessarily sorted, the logic would insert the necessary sort operations into the QRSet.

More specifically, logic 508 detects instances of Inner Join, Intersect, Relative Complement, Relative Complement By Key, Symmetric Difference, Union, and Substitute By Key, and analyzes the keys involved to determine if they are sort comparable. One embodiment, for example, uses two broad sort comparison types: numbers and strings. If the keys are not sort comparable then the conversion injects a Select Columns operation to one of the inputs so that the keys are sort comparable. Select Columns, like all other operations, can be used to perform a type conversion through appropriate specification of DSet inputs and outputs. Select Columns is preferred as an independent "injected" operation for this task as its implementation is fast. Some queries may use appropriate modification of other operations, rather than injection of an independent operation, but independent operations have an advantage of easy implementation.

Logic 508 then analyzes the inner program to detect operators that correspond to primitive operators that require their inputs to be sorted and upon such detections inserts the appropriate sort operation according to the corresponding keys. More specifically the logic 508 detects instances of Inner Join, Intersect, Relative Complement, Symmetric Difference, Union, Group-And-Count, Sum over Groups by Key, Max, Min, Average, and Standard Deviation, Row Mode, Median, Count Unique Rows, Substitute By Key, and Relative Complement by Key and injects into the QRSet, before the operators themselves, the appropriate sort, corresponding to the keys in these operators. The sort takes all keys in key order as sort key inputs and then uses all other domains on the operator needing sorting as the non-sorted inputs to the sort by key operator. The outputs of the sort by key operator will go to the inputs of the questioned operator (such as sum over groups) both keyed and unkeyed as appropriate.

Logic 508 detects and removes redundant Select Columns operations, i.e., selection operations that perform a selection already being done by a necessarily preceding section of the program.

After the logic 508 is done the query is now represented as a QRSet. This inner language form, as outlined above, is then evaluated by the inner evaluation system 404 which, in turn, creates another expression of the query, the oper set. The inner evaluation system 404 is directly called by the outer evaluation system 402, as described with reference to FIG. 4.

Figure 6:
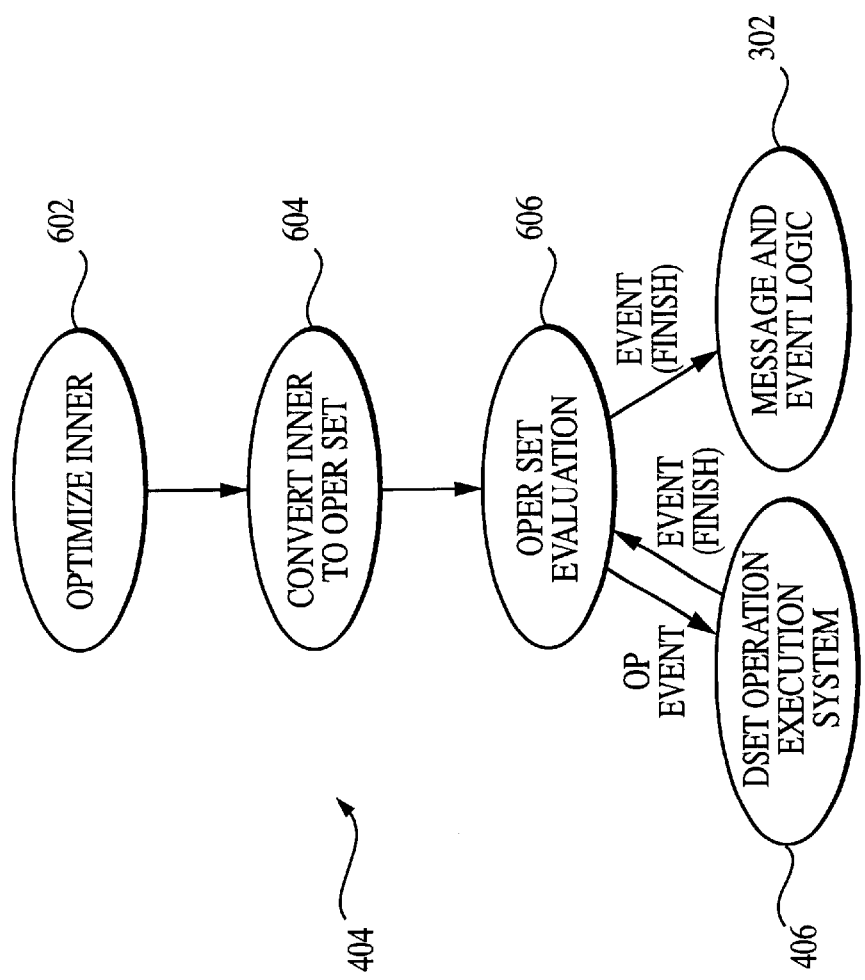
FIG. 6 shows inner language evaluation logic according to a preferred embodiment of the invention.

The inner evaluation system 404 is shown in FIG. 6 in more detail. Inner evaluation system 404 includes
- logic 602 to transfer the inner language expression to an optimized form;
- logic 604 which converts the optimized inner form to a set of primitive operations that may be executed by the server's internal engine (described below); and
- logic 606 that invokes DSet Operation Execution system 406

Logic 602 performs yet more optimizations on the query. These optimizations may alternatively be performed in the outer evaluation system 402. Logic 602 combines sorts. More specifically, it finds pairs of sort operators that sort the same input table such that the column sequences defining the sort orderings are equal up to the length of the shorter of the two column sequences defining the key orderings. Logic 602 then replaces these sorts by deleting the second sort and substituting, for the first sort, a Sort by Key that has the longer of the two column sequences and it includes all of the data columns present in either of the two sort operators. This sort subsumption is valid because the implementation of all operation primitives preserve the "sortedness" of data.

Logic 602 also inserts a Select Column operation before every Sort operator and defines the Select Column operation so that it selects only as many columns from the table as needed for the sort key and output columns. This avoids copying of unneeded data within the sort implementation, described in a later section.

Logic 602, analogously to logic 508, detects and removes redundant Select Columns operations. Logic 602 also normalizes the identifiers and names of the inner language expression.

Logic 602 then performs global optimization of the query by using tables already available in the workspace, i.e., cached results. If the "intension" for a table in the workspace does all or part of the work needed by a portion of the query being evaluated, then that portion of the query is removed and the parts of the query that relied on the output of the removed portion are changed to use the pre-existing table. One embodiment determines that a workspace table may be used by looking for identical intensions between the query being optimized and prior queries. That is, the logic compares the stored intension of a table (i.e., a QRSet) with portions of the query being evaluated. Alternatively, the logic may incorporate algorithms to detect semantic equivalence of intensional forms. These algorithms may consider associativity, commutivity, transitivity, and other properties in detecting equivalence. Also the optimization may look for tables that satisfy portions of the query but which may not be as restrictive as sought. For example, a query being evaluated may have a set membership restriction asking for "all males in Wichita, Kansas." The most restrictive intension that would satisfy this would be a table having an intension identical to or semantically equivalent to "all males in Wichita, Kansas." However, other forms may be useful. In particular existing tables with less restrictive intensions may be used beneficially. Of these less restrictive forms, the most restrictive of them would fit best and could be used as a starting point, in which other operations are added to yield the intension sought. That is, the most restrictive of the less restrictive forms could be used as a starting point and be substituted into the query and operations may be injected to complete the intension, i.e., to further restrict the substituted form into the form sought. For example, a table may exist having "all males in Kansas." This table may be used (provided appropriate other data exists) in the expression and further restricted. Finding all males in Wichita from this table would be less costly than finding all males in Wichita Kansas from the original data sources. The optimization logic finds such tables and uses them and inserts the appropriate subsequent restrictions.

Under one embodiment, logic 602 also selects an appropriate inner language operation depending on the context. As stated above, each outer language operation corresponds to at least one inner language operation. Multiple inner language operations are used because some operation implementations may be better suited to a particular context. A given "sort" for example may be the best choice for large sets but not for small ones. Consequently, logic 602 selects a context sensitive theorem and considers, among other things, the size of the sets, the size of the sets relative to the size of memory buffers, and the size of the operands, relative to one another, in selecting the appropriate inner language operation. Another embodiment considers the frequency of query interaction. A Hash Join, for example, provides good performance on a single use because among other things it does not require presorted input data. However, if the operation is to be repeated, an alternative join (with the injected overhead of sorting data) will be preferable. That is, the multiple uses will offset the cost of injecting an appropriate sort.

Logic 604 then copies the inner language program to form a set of operation primitives to be executed. This process includes adding control structures to each operation in the primitive operation set to facilitate the control thereof according to a data flow scheduling algorithm. This form is the oper set, i.e., a sequence of opers. Each oper is a control structure for each operation in the inner language program. All opers reference the inner language program so that updates to the inputs and outputs can be made so that the DSet operation execution system 406 can perform data flow scheduling.

After the oper set is formed, the logic 606 receives the oper set and invokes the DSet operation execution system 406, as the operators become "ready" to execute. In a preferred embodiment, "ready" means from a data flow scheduling perspective of which the inputs are valid. This logic 606 invokes the DSet system 406 to schedule the primitives for execution according to a data flow scheduling algorithm, in which an operation is "fired" when all of its necessary inputs are detected as being "ready". Inputs are ready when they exist in extensional form in the workspace. Preferably, a given primitive operation is "fired" to execute as its own execution thread on the server, thus increasing the execution parallelism further. The scheduling of opers within an oper set are implemented with a separate event queue. This event queue has specific logic to handle the control structures associated with an oper and to detect when an oper is ready to be executed.

Figure 7:
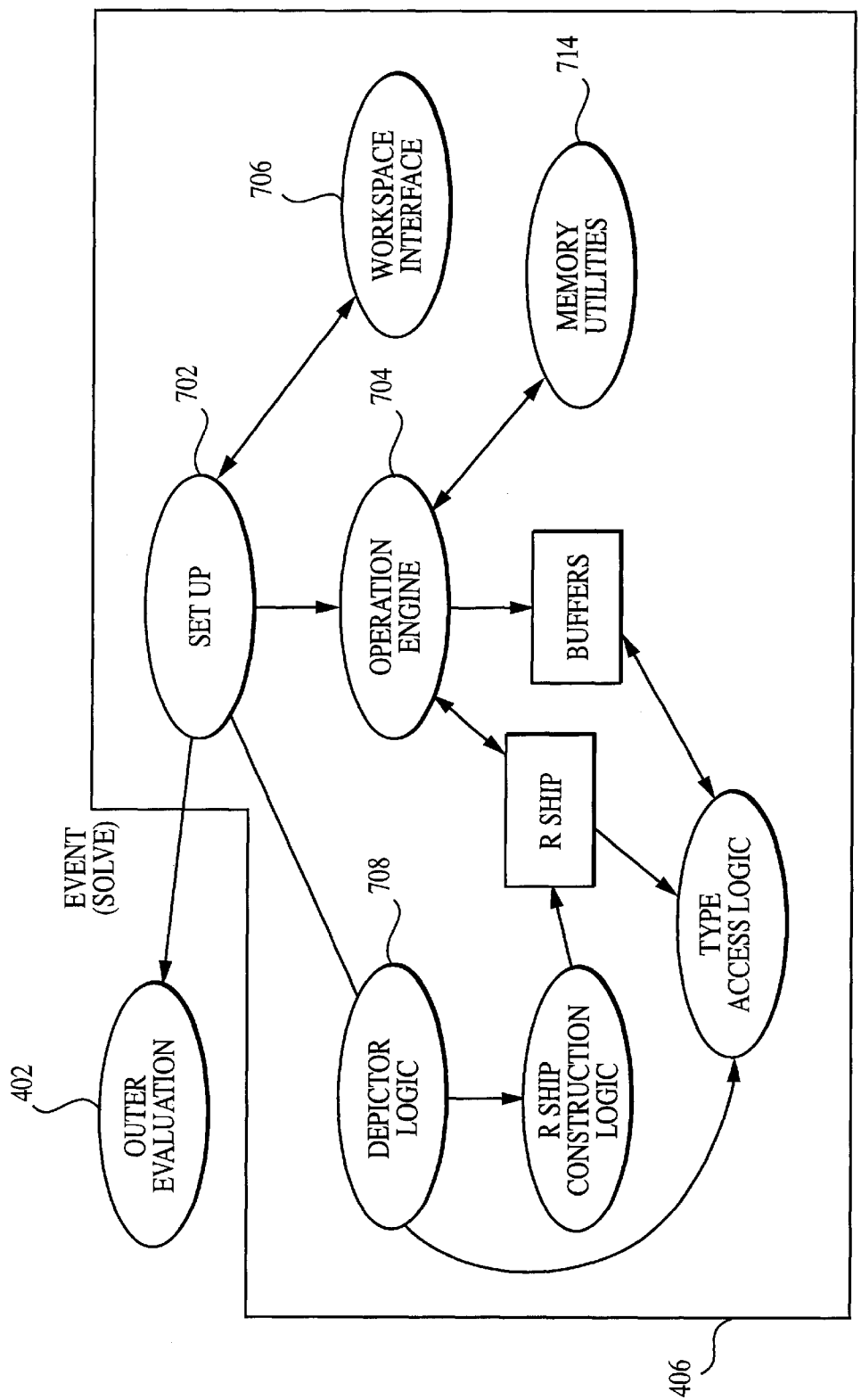
FIG. 7 shows server engine logic according to a preferred embodiment of the invention.

The DSet operation execution system 406 is shown in more detail in FIG. 7. The DSet operation execution system 406 includes set up logic 702; internal engine 704; workspace interaction logic 706; depictor system 708; RShip construction logic 710; type access system 712; and memory utilities 714.

The set up logic 702 ensures that the DSets involved are ready, i.e., with open files. Under one embodiment this logic will determine whether the input DSets exist in extensional form and if not will cause them to be so. Another embodiment however performs the above just before global optimization is performed by inserting the appropriate operation blocks before the blocks requesting the DSets.

The set up logic 702 cooperates with the outer evaluation system 402, as outlined above. In particular, the set up logic 702 detects the existence of Evaluate opers and sends a solve event to the outer evaluation system 402 so that it may evaluate the instantiations of the corresponding query. In response to such an event from the DSet operation execution system 406 the outer evaluation system 402 will instantiate and submit it to full outer and inner language evaluation, as necessary. If a QRSet exists, that will be the starting point of function instantiation.

The set up logic 702 is also responsible for re-expressing a given oper from an operation with input and output DSets to a primitive operation that operates in conjunction with a corresponding RShip and in which the data is in XSet form. RShips are used to control all data access and data storing in result sets. Under a preferred embodiment they are also used to convert input data (as needed) from one type to output data of another type; that is, conversion during transfer of elements. Under a preferred embodiment they are also used to convert data in relator operations, both in a comparative sense and in an arithmetic sense; for example, when relating a floating point an integer. (The types are identified by the input and output DSets.) The RShip will abstract the algorithm (for the most part) from the data types of the data involved. More specifically, the set up logic 702 invokes the depictor logic 708 to initiate the construction of an RShip for a corresponding oper. The depictor logic 708 analyzes the Depictors for input and output DSets corresponding to the oper and also analyzes the oper to determine whether it is for a relator and constructs the corresponding RShip structure to map the data conversions involved with data transfer and/or comparison aspects involved with the operation. An operation may require more than one RShip for its execution. For instance, the Add operator has an RShip that describes the domain relationship between two operands and another RShip for transferring the results. Also, an inner join, for example, involves both data transfer and comparison operations. Persons skilled in the art will appreciate from reviewing the "Operators and Types" section that the number of RShips is operation dependent as each has its own inherent number of transfer and relator sub-operations. The RShip, in addition to containing mapping information, will contain corresponding control structures involved with the conversion. For example, the RShip may contain high-level control logic for iterating over the domains involved. The RShip structure thus has the mapping information and control logic. It relies on type access logic 712 to perform the actual conversions of data.

For example, a select may have an input of a first type and an output of a second type. The RShip structure in such case will construct n-tuples indicating the corresponding mapping. Moreover, the operation involved may be a relator operation such as Equal To and may involve inputs of disparate types. The RShip in such case, will map the appropriate conversions needed for the comparison operation, as outlined above. Under one embodiment, loop unfolding techniques may be used to pre-load RShips and delimeters.

The set up logic 702 also allocates buffers as necessary for intermediate results.

The engine 704 includes oper algorithm logic for each of the inner language operations. The implementations follow standard expressions of the algorithms (e.g., by Knuth) but are preferably type-less, avoid conditional execution, and are maximally abstracted from the data. Preferably the algorithms use a single pass over the data. Some algorithms, as is known, require multiple passes, e.g., sort. The algorithms are implemented to tell a corresponding RShip to compare and transfer data as needed by the operation. In some instances the data will be transferred to a buffer so that it may be further manipulated by the algorithm logic. In other instances, the algorithm logic will not need to do any further manipulations (e.g., Inner Join and Select). In short, the algorithms are the higher level controls to transfer and/or compare and at times to perform some further manipulation. The actual transfer, comparison, and conversion are abstracted and performed by the RShip and thus the algorithms are made type-less where the operation permits. (For example, some string manipulation operations will need to actually manipulate the data, not just instruct an RShip to transfer and compare, and inherently convert, it.)

The set handling engine 704 includes logic allowing multi-threaded access to files. This logic is included because the operations are handled by multiple threads. Some operating systems do not permit transparent multiple access to a file from different places in multiple threads. To address this, logic references Xset files and includes access counters to interface file access. The multiple threads access the engine's interface logic rather than the underlying file system to see if files are open and to cause the corresponding file operations. (Mutex controls are used to maintain coherency of the interface logic.)

The engine memory utilities are used for accessing and allocating memory. For example, they may be used to allocate contiguous physical chunks of memory. The buffer allocation is mapped to table rows and the services may be used to access the desired row of a table, while hiding the mapping details. Other memory utilities (lower level) are preferably used to abstract type conversions, such as endian conversions for floating point data.

The workspace logic 708, cooperates with the workspace system, and is used both in allocation and committal of DSets. When an operation is being executed, the logic needs to allocate DSets for outputs. The workspace logic 708 will make such requests to the workspace system. When an operation has finished execution, thus defining the data for the corresponding output DSet, it is "committed" to the workspace indicating it is valid. At this point it may be used for viewing and/or global optimizations, and as inputs to operations, among others.

Operators and Types

This section described the operators and types of a preferred embodiment. Persons skilled in the art will appreciate that the set of operators and types may be modified significantly without departing from the scope of the invention.

Data Types

The data types for both the outer and also the inner programming languages include Int8; Int16; Int32; Int64; Uint8; Uint16; Uint32; Uint64; FloatS (32-bit floating point number); FloatB (64-bit floating point number); Float precision (64-bit floating point with specified precision) StrFA (common string type); StrXA (DPSet string type for "delimited" strings); Byte (basic string type used to implement both StrFA and also StrXA); Time; Date; and DateTime.

Outer Operators and Constraints

The operators defined for the outer language are described below. The "non-kernel" operators are "macro" operators that are converted to program fragments built out of kernel operators. The non-kernel constraints are replaced by a combination of kernel operators and modifications of existing portions of the query program. Some of the non-client-visible kernel operators are used by the server to implement some of the non-kernel operators and constraints (e.g. Binary Concatenate Strings is used to implement Concatenate Strings, Evaluate is used to implement Query, Generate Strings from Regular Expression is used with Inner Equijoin to implement the Regular Expression Match constraints).

Constraints

1. Equal To (constraint, non-kernel)
    1. equal_to(In1, In2)
    Constrain any use of tables elsewhere in the program, containing the equal_to constraint operator, where those tables are referred to by In1 or In2 items, to be references to the corresponding columns of the table that is the inner equi-join of the In1 and In2 tables with join keys of In1 and In2 if In1 and In2 are from different tables, or the select-rows of the table In1 and In2 such that the corresponding columns of In1 and In2 are equal if In1 and In2 are from the same table.
2. Greater Than Or Equal To (constraint, non-kernel)
    1. greater_than_or_equal_to(In1, In2)
    Same definition as the greater_than constraint operator, except using the greater_than_or_equal_to relator instead of the greater_than relator.
3. Greater Than (constraint, non-kernel)
    1. greater_than(In1, In2)
    Constrain any use of tables elsewhere in the program, containing the greater_than constraint operator, where those tables are referred to by In1 or In2 items, to be references to the corresponding columns of the table that is the theta join of the In1 and In2 tables with theta join constraint of In1 greater_than In2 if In1 and In2 are from different tables, or the select-rows of the table of In1 and in2 such that In1 greater_than In2 if In1 and In2 are from the same table.
4. Less Than (constraint, non-kernel)
   1. less_than(In1, In2)
   Same definition as the greater_than constraint operator, except using the less_than relator instead of the greater_than relator.
5. Less Than Or Equal To (constraint, non-kernel)
   1. less_than_or_equal_to(In1, In2)
   Same definition as the greater_than constraint operator, except using the less_than_or_equal_to relator instead of the greater_than relator.
6. Not Equal To (constraint, non-kernel)
   1. not_equal_to(In1, In2)
   Same definition as the greater_than constraint operator, except using the not_equal_to relator instead of the greater_than relator.
7. Regular Expression Match, Right (constraint, non-kernel)
   1. regexp_right(Data, Pattern).
   Same definition as equal_to, but instead of "the inner equi-join of the In1 and In2 tables with join keys of In1 and In2" this is the inner equi-join restriction of the data table and the single column of the output GenStrings table of "generate_strings_regexp(Pattern)=>GenStrings": inner_equijoin(Data, Data, GenStrings, [])=>RestrictedData.
8. Regular Expression Match, Left (constraint, non-kernel)
   1. regexp_left(Pattern, Data).
   Same definition as Right Regular Expression Match, with the order of the operands reversed.

Operators
1. Aggregate By Group (non-kernel)
   1. aggbygroup(Data, StatOps, Key, GroupNames, Left, Relator, Right) =>Output
   Data and StatOps have the same number of items. The StatOp item corresponding to a Data item indicates the statistic (e.g. min, max, average) that is to be calculated for the column indicated by that Data item. Left/Relator/Right is a triple of connectors that specifies a collection of constraints. These constraints are used to select rows from Data. The collection may define a disjunction of multiple conjunctions of constraints (e.g. ((A1<A2 and Bi=B2) or (C1>= C2 and D1!=D2) or (E1=E2 and F1<=F2))). GroupNames associates a "name" with each disjunct of Left/Relator/Right (e.g. G1 with (A1<A2 and B1=B2), G2 with (C1>=C2 and D1 !=D2), and G3 with (E1=E2 and F1<=F2)). Output has one column for each item in Data, plus a column for "group names".
   If Key has no items, then Output has one row for each group name such that a non-group-name cell in a row is the result of the corresponding statistic from StatOps applied to all of the cells in the column corresponding Data item of the selected data for that group. If Key has one or more items, then the selected data of the corresponding Data item is grouped according to the Key items and the corresponding statistic is calculated for each such group; there are as many rows in Output per group as there are key-groups.
2. Aggregate By Key (non-kernel)
   1. aggbykey(Data, StatOps, Key)=>Output
   Data and StatOps have the same number of items. The StatOp item corresponding to a Data item indicates the statistic (e.g. min, max, average) that is to be calculated for the column indicated by that Data item. Output has one column for each item in Data. If Key has no items, then Output has one row for each group name such that a non-group-name cell in a row is the result of the corresponding statistic from StatOps applied to the data of all of the cells in the column of the corresponding Data item. If Key has one or more items, then the data of the corresponding Data item is grouped according to the Key items and the corresponding statistic is calculated for each such group; there are as many rows in Output per group as there are key-groups.
3. Concatenate Strings (non-kernel)
   1. concatstr(Input)=>Output
   Input contains two or more items. All of the column references among these items must be to the same table. There may be any number of scalar items interspersed among column reference items. Output contains one column Output contains the same number of rows as the input table implied by the column references of Input. Each cell of Output is the concatenation of the string representations of the values of the specified columns of the corresponding input table row, in the order given in Input and with the scalars if Input interspersed as specified in Input.
4. Query (program structure, non-kernel)
   1. query<FunctionName>(In1, . . . , InJ)=>[Out1, . . . , OutK]
   FunctionName is a scalar string value. This operator has the same definition as: evaluate(FunctionNameItem, In1, . . . , InJ)=>[Out1, . . . , OutK]. FunctionNameItem is a scalar item with the value of FunctionName. See the evaluate operator definition.

Clienit-visible Operators
1. Absolute Value
   1. abs(Input)=>Output.
   Each cell of Output contains the absolute value of a corresponding cell in Input.
2. Accept
   1. accept(In1, In2)=>Output.
   If In1 is "void" then Output is derived from In2. If In2 is "void" then Output is derived from In1. If In1 and In2 are both non-void, then Output is union(In, In2).1
3. Add
   1. add(In1, In2)=>Output
   If In1 is a scalar S, then each cell of Output is the S plus the corresponding cell of In2. If ln2 is a scalar S, then each cell of Output is the S plus the corresponding cell of In1. If In1 and In2 are both tables (non-scalars), then each cell of Output is the corresponding cell of In1 plus the corresponding cell of In2.
4. Average
   1. avg(Input, Key)=>Output
   Output has the same number of columns as Input. If Key is empty, then Output has one row where each cell of the row is the average value of the cells for the corresponding column of Input. If Key is not empty, then the rows of Input are grouped according to Key and Output has one row for each key group where each cell of a row is the average value of the corresponding group of cells for the corresponding column of Input.
5. Compare
   1. compare(Left, Relator, Right)=>Output
   Left/Relator/Right are a connector triple that defines a conjunction of constraints. Either one of Left and Right contains a scalar value and the other one a column reference, or else both Left and Right contain column references and the columns are in the same table. Left and Right column references imply an input table.
   Output contains one column. Output contains the same number of rows as the implied input table of Left and Right. Each cell in Output contains 1 if the conjunction of Left/Relator/Right is true for the corresponding row of the input table, otherwise it is 0.

6. Concatenate Columns
   1. concatcol(Input)=>Output
   Input contains two or more column reference items, not necessarily from the same table. Output has the same number of columns as the items in Input. Output has the same number of rows as the smallest of the input tables associated with the items of Input. Each cell in a row of Output is copied from the cell of the corresponding Input column reference.
7. Constants To Set
   1. constset(Input)=>Output
   Input contains one or more scalar items. Output contains one column. Output contains one row for each item in Input. Each cell of Output is the value of the corresponding item from Input.
8. Convert To Lower
   1. cvrtlower(Input)=>Output
   Input contains one or more column references, all from the same table. Output contains one column for each item of Input. Output contains one row for each row of the input table. Each cell of Output contains the lower case representation of the string representation of the corresponding input column and row cell's value.
9. Convert To Proper
   1. cvrtproper(Input)=>Output
   Same as cvrtlower, but "proper case" instead of lower case.
10. Convert To Upper
    1. cvrtupper(Input)=>Output
    Same as cvrtlower, but "upper case" instead of lower case.
11. Correlation
    1. correlation(In1, In2)=>Output
    In1 has one column reference. In2 has one column reference. If In1 and In2 are different tables then they are "coerced" to a single table (by simulating a concatenate columns of the two tables). Output contains three columns: Pearson's correlation coefficient, the confidence level, and Fisher's Z. Output contains one row with the three columns calculated from the two input columns.
    The design of this may be changed to be a single input connector: correlation(Input)=>Output Input has two column references. . . the rest is the same as above.
12. Count Rows
    1. count(Input)=>Output
    Input contains a column reference. Output contains one column. Output contains one row. The cell of Output is the count of the number of rows in column referred to by the item of Input.
13. Count Unique Rows
    1. countunique(Input)=>Output
    Input contains a column reference. Output contains one column. Output contains one row. The cell of Output is the count of the number of unique values in the column referred to by the item of Input.
14. Cross Product
    1. crossprod(In1, In2)=>Output
    In1 and In2 contain one or more column references. Output contains one column for each item in In1 and In2. Let Ni be the cardinality of the table of In1, and N2 be the cardinality of the table of In2. Output contains one N1*N2 rows. The rows of Output are all possible combinations of rows of the two input tables, with only the columns identified in In1 and In2 and ordered and typed as specified in the Output definition.
15. Divide
    1. divide(In1, In2)=>Output
    Same semantics as Add, except the "divide" scalar operation is used instead of "plus".
16. Extract Substring
    1. extractstr(Data, Start, Length)=>Output
    Data, Start, and Length must all have the same number of items, all of which are column references. Start and Length must have 1 row each. Output has the same number of columns as Data. Output has the same number of rows as Data. Each cell in Output is the substring of the corresponding cell of Data, starting at the position given by the value of the corresponding cell of Start, and having the length given by the value of the corresponding cell of Length. The single row of Start and Length is re-used for each row of Data.
17. Group And Count
    1. groupcount(Data, Key)=>Output
    Data has one or more column references. Key has zero or more column references from the same table as Data's column references. Output has the same number of columns as Data plus one "count" column.
    Output has the same number of rows as there are groups in Data as defined by Key. Each row corresponds to one such group. Each row has the corresponding values from a row of the group for the columns of Data, plus the count of rows in Data for that group. An empty Key defines the whole table to be a single group.
18. Inner Join
    1. inner_equijoin(InA, KeyA, KeyB, InB)=>Output
    InA has zero or more column references. KeyA has one or more column references from the same table as InA's column references. InB has zero or more column references. KeyB has one or more column references from the same table as InB's column references. There must be at least one column reference in either InA or InB. Output has the same number of columns as InA plus InB. Output has the one row for each combination of rows from InA and InB such that KeyA equals KeyB. The cells in a row of Output have the same values as the corresponding cells in InA and InB.
19. Input (program structure)
    1. input(Ordinal, Name)=>Output
    Ordinal is a scalar integer greater than 0. Let S be the multiset of all of the ordinals of the input operators in a program: min(S)=1 and max(S)=cardinality(S). Name is a scalar string "naming" the input parameter defined by this operator. Output has one parameter item or one or more column references to table constants. The parameter item may be origin of other parameter items in the program, and these other parameter items may be used in place of a column reference or scalar item. If a parameter item is used, then the containing program is a program definition that must be instantiated before it can be evaluated. The instantiation process replaces all input-derived parameter items with either column reference or scalar items, depending on the argument items provided by the process invoking the instantiation.
20. Intersection
    1. intersection(InA, InB)=>Output
    InA has one or more column references. InB has the same number of column references as InA. Output has the same number of columns as InA. Output has the one row for each combination of rows from InA and InB such that InA equals InB. The cells in a row of Output have the same values as the corresponding cells in InA.
21. Keyed Relative Complement
    1. keyed_relcomp(InA, KeyA, KeyB)=>Output
    InA has one or more column references. KeyA has one or more column references to InA's table. KeyB has the same number of column references as KeyA.
    Output has the same number of columns as InA. Output has the one row for each of row from InA such that there does not exist a row of the table for KeyB where KeyA equals KeyB. The cells in a row of Output have the same values as the corresponding cells in InA.

22. Length
    1. lengthstr(Input)=>Output
    Input has one or more column references. Output has the same number of columns as Input. Output has the same number of rows as Input. Each cell of Output is the length of the string representation of the corresponding Input cell's value.
23. Maximum
    1. max(In1, In2)=>Output
    Same definition as the Add operator except the cell of Output is calculated using max instead of plus.
24. Maximum Row
    1. maxrow(Input, Key)=>Output
    Output has the same number of columns as Input. Output has one row per group defined by Key that is the maximum row in that group of rows in Input table according to the sort order specified by the column references in Input. If Key is empty, then the entire table is considered a single group.
25. Median Row
    1. medrow(Input, Key)=>Output
    Same definition as Maximum Row, except the row aggregate operator is "median" instead of "maximum".
26. Minimum
    1. min(In1, In2)=>Output
    Same definition as the Add operator except the cell of Output is calculated using min instead of plus.
27. Minimum Row
    1. minrow(Input, Key)=>Output
    Same definition as Maximum Row, except the row aggregate operator is "minimum" instead of "maximum".
28. Mode Row
    1. moderow(Input, Key)=>Output
    Same definition as Maximum Row, except the row aggregate operator is "mode" instead of "maximum".
29. Modulus
    1. mod(In1, In2)=>Output.
    Same semantics as Add, except the "modulus" scalar operation is used instead of "plus".
30. Multiply
    1. multiply(In1, In2)=>Output
    Same semantics as Add, except the "multiply" scalar operation is used instead of "plus".
31. Negate
    1. negate(Input)=>Output.
    Same semantics as Absolute Value, except the "negate" scalar operation is used instead of "absolute value".
32. Output (program structure)
    1. output(Ordinal, Input)=>Output
    Ordinal is a scalar integer greater than 0. Let S be the multiset of all of the ordinals of the input operators in a program: min(S)=1 and max(S)=cardinality(S).
    Input is one or more items. In a function instantiation, these items must all be column references. In a function definition, these items may be a mixture of column references and parameter items. Output has the same number of items as Input. The Output table has the same number of rows as the Input table. Each cell in a row of the Output table has the same value as the corresponding cell in the Input table. Thus, the only differences between the Input and Output tables are the column order, column names, column data types, and table names.
33. Position
    1. position(Source, Search)=>Output
    Source contains one or more items. Search contains the same number of items as Source. If all of the items of Source and Search are column references, and they are from different tables, then an implicit concatenate columns is performed. Output has the same number of columns as Source. Output has the same number of rows as the Source/Search table. Each cell's value is the index of the string representation of the corresponding Search cell's value in the string representation of the corresponding Source cell's value. If the Search cell's value is not a substring of the Source cell's value, then the index is 0. If all of the items of Source are scalar, then Search must contain column references. Output has the same number of rows and columns as Search. The cells of Output are calculated as above, but the single scalar row of Source is reused for each Search row. If all of the items of Search are scalar, then Source must contain column references. Output has the same number of rows and columns as Source. The cells of Output are calculated as above, but the single scalar row of Search is reused for each Source row.
34. Rates
    1. rates(In1, In2)=>Output
    In1 has one or more column references. In2 has the same number of column references as In1. If In1 and In2 are from different tables then the "effective input" table is the concatenate columns of In1 and In2. Output has the same number of columns as In1. Output has the same number of rows as the "effective input" table, minus 1. Each cell's value Yk of a row k is calculated from the corresponding cell's values of rows k and k+1 (A1 and A2 from In1, and B1 and B2 from In2) of the input table: Yk=(A2-A1)/(B2-B1).
35. Relative Complement
    1. relcomp(InA, InB)=>Output
    InA has one or more column references. InB has the same number of column references as InA. Output has the same number of columns as InA. Output has the one row for each of row from InA such that there does not exist a row of the table for InB where InA equals InB. The cells in a row of Output have the same values as the corresponding cells in InA. See also Keyed Relative Complement.
36. Sample Data
    1. sample(Data, Size, Start, Step)=>Output
    Data has one or more column references. Size, Start, and Step each have one scalar item. Output has the same number of columns as Data. Output has rows selected from Data based on the values in Size, Start, and Step. Size can be specified as derived from the Start and Step values, as a percentage of the number of rows in Data, or as "as many as possible up to" a specified maximum value. Start can be specified as either to be picked randomly or using a given row index (a negative index counts backward from the end of Data). The Step value can be specified as either: calculated base on the Size and Start values, to be picked randomly, or else using a specified step value (a negative step value steps from the end of Data back toward the beginning).
37. Select Columns
    1. select_columns(Input)=>Output
    Input has one or more column references. Output has the same number of columns as Input has items. Output's result table has the same number of rows as the table identified by Input's column references. Each row in Output is based on the corresponding row of the Input table. Each cell's value in Output's table is the (converted if necessary) value of the corresponding cell in Input's table.
38. Select Rows
    1. select_rows(Data, Left, Relator, Right)=>Output
    Data is one or more column references. Left, Relator, and Right are a triple of connectors that define selection constraints. Left and Right have column references or scalar items. The column references must be to the same table as the column references of Data. Relator has only scalar items that specify comparisons (<, >, =, <=, >=, !=). Left, Relator, and Right must have the same number of items in the kernel outer language. They may have differing numbers of items in the full outer language if "open" and "close" markers are used to define "nested disjunctions". For instance, (A=B and C<D) is represented in Left/Relator/Right form as: Left [A,C], Relator =[=,<], and Right =[B,D]. A "nested disjunction" of (A=(B or E) and C<D) (which is interpreted as ((A=B or A=E) and C<D)) is represented in Left/Relator/Right form as: Left =[A,C], Relator=[=,<], Right=[open,B, E,close,D]. Output has the same number of columns as Data. Output has one row for every row in Data that satisfies the constraints of Left/Relator/Right.

39. Sort All Ascending
  1. sortasc(Input)=>Output
  Input has one or more column references. Output has the same number of columns as Input has items. Output's table has the same number of rows as Input's table. Each row of Output's table is derived from the corresponding row of the sorted version of Input's table, in the same fashion as for the Select Columns operator. The sorted version of Input's table is created by sorting the table in ascending order on each of the columns of Input, with the columns have "sort precedence" in the order they appear in Input.

40. Sort All Descending
  1. sortdsc(Input)=>Output
  Same definition as Sort All Ascending, except the sorted version of Input's table is created using a descending sort on each column instead of an ascending sort.

41. Sort By Key Ascending
  1. sortasckey(Input, Key)=>Output
  Key has zero or more column references from the same table as Input. Same definition as Sort All Ascending, except if Key has one or more items in which case the sorted version of Input's table is created using the columns referenced by Key to define the sort order instead of the columns referenced by Input.

42. Sort By Key Descending
  1. sortdsckey(Input, Key)=>Output
  Same definition as Sort By Key Ascending, except the sorted version of Input's table is created using a descending sort on each column instead of an ascending sort.

43. Soundex Match, Right (proposed, constraint, non-kernel)
  1. soundex_right(Data, Pattern).
  Same definition as Right Regular Expression Match, but using the generate_strings_soundex operator instead of the generate_strings_regexp operator.

44. Soundex Match, Left (proposed, constraint, non-kernel)
  1. soundex_right(Data, Pattern).
  Same definition as Right Soundex Match, but with the operands reversed.

45. Standard Deviation
  1. stddev(Input, Key)=>Output
  Same semantics as Average, except the "standard deviation" scalar operation is used instead of "average".

46. Substitute
  1. substitute(InA, KeyA, KeyB, InB)=>Output
  InA has one or more column references. KeyA has one or more column references. InB has the same number of column references as InA. KeyB has the same number of column references as KeyA. Output's table has the same number of columns as InA has items. Output's table has the same number of rows as InA's table. Each row of Output's table has values from the corresponding row of the processed version of InA's table, in the same manner as is done for Select Columns. The processed version of InA's table has one row for each row of InA's table. For a given row of InA, if there is a row of InB's table such that KeyB equals KeyA, then the processed row of InA takes the values of the (first) matching InB row. If there is no matching row of InB, then the processed row of InA takes the values of the original InA.

47. Subtract
  1. subtract(In1, In2)=>Output
  Same semantics as Add, except the "subtract" scalar operation is used instead of "plus".

48. Subtract Substring
  1. subtractstr(Source, Search)=>Output
  Same definition as Position, except each Output cell value is the string representation of Source minus the first occurrence of the string representation of Search.

49. Sum
  1. sum(Input, Key)=>Output
  Same semantics as Average, except the "sum" scalar operation is used instead of "average".

50. Switch (program structure)
  1. switch(Control, Data)=>[Out1, Out2, . . . , OutK]
  Control has one column reference. Data has one or more column references. Only Out1 and Out2 are defined in the non-kernel/client-visible use of this operator. All Outi have the same number of column definitions as Data has column references. If there is a cell value convertible to integer N in the Control column, then OutN's table is defined the same as a select_columns(Data)=>OutN. If there is a cell value convertible to integer 0 in the Control column, then this is interpreted the same as an integer of K (i.e. the last Out connector). For all J such that there is no cell value convertible to it (according to the above, including the special handling of 0), OutJ's table is the special value "void". The void table has no columns or rows.

51. Symmetric Difference
  1. symdiff(In1, In2)=>Output In1 and In2 must have only column references and must have the same number of them. Output has the same number of column definitions as In1 has column references. Output's table is "select_columns (SymDiff)=>Output" where SymDiff is the symmetric difference table of In1's table and In2's table. The symmetric difference table of In1's table and In2's table contains one row for each row of In1 that is not in In2 where the symmetric difference table's row is a copy of the In1 table's row, and similarly one row for each row of In2 that is not in In1. See also Relative Complement.

52. Theta Join
  1. inner_thetajoin(InA, InB, Left, Relator, Right)=>Output
  InA has zero or more column references. InB has zero or more column references. Left, Relator, and Right have the same structure and interpretation as in Select Rows, with the additional restriction that Left has only column references from InA's table and Right has only column references from InB's table. There must be at least one column reference in either InA or InB. Output has the same number of columns as InA plus InB. Output has the one row for each combination of rows from InA and InB such that the constraints of the Left/Relator/Right connectors are satisfied. The cells in a row of Output have the same values as the corresponding cells in InA and InB, converted as necessary if the corresponding columns have different data types.

53. Union
   1. union(InA, InB)=>Output

InA has one or more column references. InB has the same number of column references as InA. Output has the same number of columns as InA. Output's table has the one row for each row from InA's table and each row from InB's table. The rows of Output's table have the same relative ordering as the rows of InA's and InB's tables, sorted by the "keys" defined by InA and InB items, respectively.

Non-client-visible Operators (Server-generated)
1. Binary Concatenate Strings (non-client)
   1. concatstr(In1, In2)=>Output In1 and In2 have a single item each. If they are both column references, they must be from the same table. Output has one column. Output has one row for each row in the input table. Each cell is the concatenation of the string representations of the two corresponding input values.

2. Evaluate (program structure, non-client)
   1. evaluate(FunctionName, In1, . . . , Inj)=>[Out1, . . . , OutK]

FunctionName is a scalar item. The interpretation of Ini and Outi are dependent on the definition of the function named FunctionName in the same workspace as the query containing this operator. A function definition is an outer language program with any number of input and output parameter operators. Each input parameter operator defines an input connector: if the input parameter operator's ordinal input is X, then it maps to the X'th connector of a query <FunctionName>operator. Each output parameter operator defines an output connector: if the output parameter operator's ordinal input is Y, then it maps to the Y'th output connector. The relationship between Ini and Outi connectors, whether items on one require items on the other or whether there are "standard" column references that always appear on one or more Outi connectors, all depends on the definition of FunctionName.

3. Generate Strings from Regular Expression (non-client)
   1. generate-strings-regexp(Pattern)=>Output Pattern is one or more scalar items. Output's table is an intensional table of one column. Output's table has many rows as there are strings that can be "generated" from the regular expression given on the Pattern connector: a string is generated from a regular expression R if that R matches that string under the "regular expression matching" algorithm. Since there may be infinitely many strings that could match a given regular expression, Output's table cannot (in general) have an explicit "extensional" representation. For an intensional table only a few operations may be defined. One of these is always "is_member(X)", where the intensional table "system" can always answer yes or no to such a question for a particular intensional table. This mechanism is currently used (through the RShip system) to implement inner-join restriction of a "normal" extensional table against an intensional table to produce a new extensional table.

Other Operators
1. Aggregate By Group (non-kernel)
   1. aggbygroup(Data, StatOps, Key, GroupNames, Left, Relator, Right) =>Output Data and StatOps have the same number of items. The StatOp item corresponding to a Data item indicates the statistic (e.g. min, max, average) that is to be calculated for the column indicated by that Data item. Left/Relator/Right is a triple of connectors that specifies a collection of constraints. These constraints are used to select rows from Data. The collection may define a disjunction of multiple conjunctions of constraints (e.g. ((A1<A2 and B1=B2) or (C1>=C2 and D1!=D2) or (E1=E2 and F1<=F2))). GroupNames associates a "name" with each disjunct of Left/Relator/Right (e.g. G1 with (A1<A2 and B1=B2), G2 with (C1>=C2 and D1 !=D2), and G3 with (E1 =E2 and F1<=F2)). Output has one column for each item in Data, plus a column for "group names". If Key has no items, then Output has one row for each group name such that a non-group-name cell in a row is the result of the corresponding statistic from StatOps applied to all of the cells in the column corresponding Data item of the selected data for that group. If Key has one or more items, then the selected data of the corresponding Data item is grouped according to the Key items and the corresponding statistic is calculated for each such group; there are as many rows in Output per group as there are key-groups.

2. Aggregate By Key (non-kernel)
   1. aggbykey(Data, StatOps, Key)=>Output

Data and StatOps have the same number of items. The Statop item corresponding to a Data item indicates the statistic (e.g. min, max, average) that is to be calculated for the column indicated by that Data item. Output has one column for each item in Data. If Key has no items, then Output has one row for each group name such that a non-group-name cell in a row is the result of the corresponding statistic from StatOps applied to the data of all of the cells in the column of the corresponding Data item. If Key has one or more items, then the data of the corresponding Data item is grouped according to the Key items and the corresponding statistic is calculated for each such group; there are as many rows in Output per group as there are key-groups.

3. Concatenate Strings (non-kernel)
   1. concatstr(Input)=>Output

Input contains two or more items. All of the column references among these items must be to the same table. There may be any number of scalar items interspersed among column reference items. Output contains one column Output contains the same number of rows as the input table implied by the column references of Input. Each cell of Output is the concatenation of the string representations of the values of the specified columns of the corresponding input table row, in the order given in Input and with the scalars if Input interspersed as specified in Input.

4. Query (program structure, non-kernel)
   1. query<FunctionName>(In1, . . . , InJ)=>[Out1, . . . , OutK]

FunctionName is a scalar string value. This operator has the same definition as: evaluate(FunctionNameItem, In1, . . . , InJ)=>[Out1, . . . , OutK]. FunctionNameItem is a scalar item with the value of FunctionName. See the evaluate operator definition.

Advantages

The system and method just described allows:

1. Scalability through composition: the preferred embodiments use theorembased compositions of sets into tables and as a result sequences of sets may be composed into tables which are much larger than can be effectively handled by small operating system file systems.

2. Set-Theoretic Programming Language: a query in the preferred embodiments is a form of set language program. The query language is diagrammatic, supports parameterized queries, recursive functions, and decision arbitration components.

3. Parallel Query Evaluation: the preferred embodiments schedule evaluation and solving based upon operation input readiness.

4. Second Order Logic Theorem Proving: a preferred embodiments accomplish a second order logic theorem proving system. This includes theorems for translating from a high level form into a low level form, theorems that recognize and properly set up the low level executable form, theorems that optimize sequences of instruction to ensure proper preparation prior to execution of certain types of instructions and to remove redundant instructions and perform local optimizations based on set-theoretic identities, and theorems for global optimization, such as identifying cache results that may be used for a current query.

5. Adaptive Physical Design: the extensional form of sets forms the physical "building blocks" of the data base. As the extensional forms are added or deleted from the database through the use of the system, the physical design of the database changes. These changes reflect optimizations for disc space and set or structure utilization.

6. All types or relational types: the architecture supports virtually all types as relational types, even pictures, sounds, and tables. This means that these complex or non-traditional types can be used as keys in relational operations such as various selection operations.

7. Composition and Decomposition of Types: types may be composed and decomposed to create new types or break up domains or compose domains within tables and between tables. For instance, a date may be decomposed into three integers, and likewise, three integers may be composed into a date. A name may be decomposed into three name part strings and three strings may be composed into a name.

8. All aspects of the server may be utilized in queries: for instance, a user may query the system concerning the current set of active clients, number of sets which are greater than three million records, or how many sets have been created within the last three weeks. Most important, queries may be used to question the system about the form of the database as it exists, the domains and sets present, and the relation of names, types and size of sets as a match for possible operations. The results of these query functions may be used to guide query execution, to post to the user such things as consistency and normalization information about tables and functional dependency information and possible join opportunities between tables and with end tables.

9. Peer-client type and server architecture: each serve may be a client to another server allowing databases to be shared among different machines and to exist on multiple machines.

10. Database composition: this allows users to create databases and then share the results of analysis and optimization with other databases. The sharing occurs through inheritance. The sets that exist in a "super" database are available to all databases that are derived from the super database.

11. Programming Language. Each operator and function call includes table and column definitions for each of its output sets, eliminating the need for separate from the query schema definitions processing or storage; i.e., eliminating the need to maintain and work with schema definitions.

It will be apparent from the following description that alternative arrangements may be easily employed and that they should be considered within the scope of the invention. For example, a multi-tiered approach may be used in which the server logic is divided for execution on multiple, hierarchically-arranged servers. For example, server 104 may be implemented on multiple computer nodes to improve performance, distribute processing, improve fault tolerance, or the like. Skilled artisans will appreciate, upon reading the disclosure, that alternative data arrangements may be substituted.

What is claimed is:

1. A system for exploring relationships in data stored in a computer readable medium, comprising:

first logic to maintain sets of data in a computer readable medium, including at least one intensional expression and one extensional expression of at least one set resulting from an evaluation of a first query;

second logic to transform a second query into a set program;

third logic, cooperating with the first logic, to determine whether a sub-expression of the set program is satisfied by a set maintained by the first logic;

fourth logic, cooperating with the third logic, to remove the sub-expression from the set program and to use the set maintained by the first logic that satisfies the sub-expression of the set program; and fifth logic for removing at least one of the sets from the computer readable medium based on at least one of usage history and set size.

2. The system of claim 1 wherein the third logic and first logic cooperate by determining whether an intensional expression for the sub-expression is identical to the intensional expressions maintained by the first logic.

3. The system of claim 1 wherein the third logic and first logic cooperate by determining whether an intensional expression for the sub-expression is less restrictive to the intensional expressions maintained by the first logic.

4. The system of claim 3 wherein the fourth logic includes logic to add further set program set expressions to the set program to fully satisfy the set maintained by the first logic.

5. The system of claim 1 wherein the third logic and fourth logic automatically determine satisfaction and perform substitution without user intervention.

6. The system of claim 1 wherein the fifth logic cooperation with at least one of the first logic, the second logic, the third logic, and the fourth logic.

7. The system of claim 1 wherein the fifth logic cooperation with each of the first logic, the second logic, the third logic, and the fourth logic.

8. The system according to claim 1 wherein each of the at least one intensional expression takes zero or more inputs and produces an output, wherein there is a caching reference to the intensional expression for the output.

9. The system according to claim 1 wherein each of the at least one intensional expression takes zero or more inputs and produces two or more outputs, wherein there is a caching reference to the intensional expression for each of the two or more outputs.

10. A system for exploring relationships in data stored in a computer readable medium, comprising:

means for maintaining sets of data in a computer readable medium, including at least one intensional expression and one extensional expression of at least one set resulting from an evaluation of a first query;

means for transforming a second query into a set program;

means, cooperating with the maintaining means, for determining whether a sub-expression of the set program is satisfied by a set maintained by the maintaining means;

means, cooperating with the determining means, for removing the sub-expression from the set program and using the set maintained by the maintaining means that satisfies the sub-expression of the set program; and means for removing at least one of the sets from the computer readable medium based on at least one of usage history and set size.

11. The system of claim 10 wherein the determining means and maintaining means cooperate by determining whether an intensional expression for the sub-expression is identical to the intensional expressions maintained by the maintaining means.

12. The system of claim 10 wherein the determining means and maintaining means cooperate by determining whether an intensional expression for the sub-expression is less restrictive to the intensional expressions maintained by the maintaining means.

13. The system of claim 12 wherein the removing means includes means for adding further set program set expressions to the set program to fully satisfy the set maintained by the maintaining means.

14. The system of claim 1 wherein the determining means and maintaining means automatically determine satisfaction and perform substitution without user intervention.

15. A computer-implemented method of exploring relationships in data stored in a computer readable medium, comprising:

maintaining sets of data in a computer readable medium, including at least one intensional expression and one extensional expression of at least one set resulting from an evaluation of a first query;

transforming a second query into a set program;

determining whether a sub-expression of the set program is satisfied by a maintained set;

removing the sub-expression from the set program and using the maintained set that satisfies the sub-expression of the set program; and removing at least one of the sets from the computer readable medium based on at least one of usage history and set size.

16. The method of claim 15 wherein determining whether a sub-expression of the set program is satisfied by a maintained set includes determining whether an intensional expression for the sub-expression is identical to an intensional expression of a maintained set.

17. The method of claim 15 wherein determining whether a sub-expression of the set program is satisfied by a maintained set includes determining whether an intensional expression for the sub-expression is less restrictive to an intensional expression of a maintained set.

18. The method of claim 17 further including adding set program set expressions to the set program to fully satisfy the set maintained by the first logic.

19. The method of claim 15 wherein determining whether a sub-expression of the set program is satisfied by a maintained set and removing the sub-expression from the set program and using the maintained set that satisfies the sub-expression of the set program are performed without user intervention.

* * * * *

UNITED STATES PATENT AND TRADEMARK OFFICE
CERTIFICATE OF CORRECTION

PATENT NO.     : 6,327,587 B1
DATED          : December 4, 2001
INVENTOR(S)    : Michael Forster It is certified that error appears in the above-identified patent and that said Letters Patent is hereby corrected as shown below:

<u>Title page,</u>
Item [*] section, please insert -- This patent is subject to a terminal disclaimer. --
Item [45], please insert -- * -- before Dec.
Item [56], References Cited, please insert --
5,600,831 * 2/1997 Levy et al. ……….  707/2
5,712,960 * 1/1998 Chiopris et al. ……  706/61
5,768,578 * 6/1998 Kirk et al. …………  707/100 --

Signed and Sealed this

Twentieth Day of August, 2002

Attest:

Attesting Officer

JAMES E. ROGAN
*Director of the United States Patent and Trademark Office*